United States Patent [19]

Reinert et al.

[11] Patent Number: 5,577,203
[45] Date of Patent: Nov. 19, 1996

[54] VIDEO PROCESSING METHODS

[75] Inventors: Christopher L. Reinert; Sudhir Sharma; Robert M. Nally, all of Plano; John C. Schafer, Wylie, all of Tex.

[73] Assignee: Cirrus Logic, Inc., Fremont, Calif.

[21] Appl. No.: 402,934

[22] Filed: Mar. 13, 1995

Related U.S. Application Data

[63] Continuation of Ser. No. 99,194, Jul. 29, 1993, abandoned.

[51] Int. Cl.$^6$ ................................................ G09G 5/00
[52] U.S. Cl. ................................ 345/200; 395/515
[58] Field of Search .......................... 345/113, 114, 345/115, 186, 190, 250, 154, 119; 365/221, 230.25; 348/411; 395/166

[56] References Cited

U.S. PATENT DOCUMENTS

| | | | |
|---|---|---|---|
| 4,847,621 | 7/1989 | Colles | 341/148 |
| 4,857,929 | 8/1989 | Katzenstein | 341/148 |
| 4,891,788 | 1/1990 | Kreifels | 365/221 |
| 4,899,151 | 2/1990 | Colles | 341/145 |
| 4,904,922 | 2/1990 | Colles | 341/136 |
| 4,961,071 | 10/1990 | Kross | 345/119 |
| 5,065,369 | 11/1991 | Toda | 365/230.25 |
| 5,220,312 | 6/1993 | Lumelsky et al. | 345/200 |
| 5,291,275 | 3/1994 | Lumelsky | 348/441 |

OTHER PUBLICATIONS

"Session XIV: Data Acquisition and Conversion, THPM 14.6: A 60 ns Glitch–Free NMOS DAC," V. Shen, D. Hodges, 1983 IEEE International Solid-State Circuits Conference, pp. 188–189.

"An 80–MHz 8–bit CMOS D/A Converter," T. Miki, Y. Nakamura, M. Nakaya, S. Asai, Y. Akasaka, Y. Horiba, IEEE Journal of Solid–State Circuits, vol. SC–21, No. 6, Dec. 1986, pp. 983–988.

*Primary Examiner*—Mark R. Powell
*Assistant Examiner*—Matthew Luu
*Attorney, Agent, or Firm*—Fulbright & Jaworski L.L.P. Dallas Office

[57] ABSTRACT

Methods are provided for transferring a stream of video data from a video data source to a display interface unit 20. A video data word is clocked into a first-in-first-out memory 30 by a first clock and clocked out of memory 30 by a second clock generated from a clock received from an associated graphics controller.

3 Claims, 31 Drawing Sheets

FIG. 4c

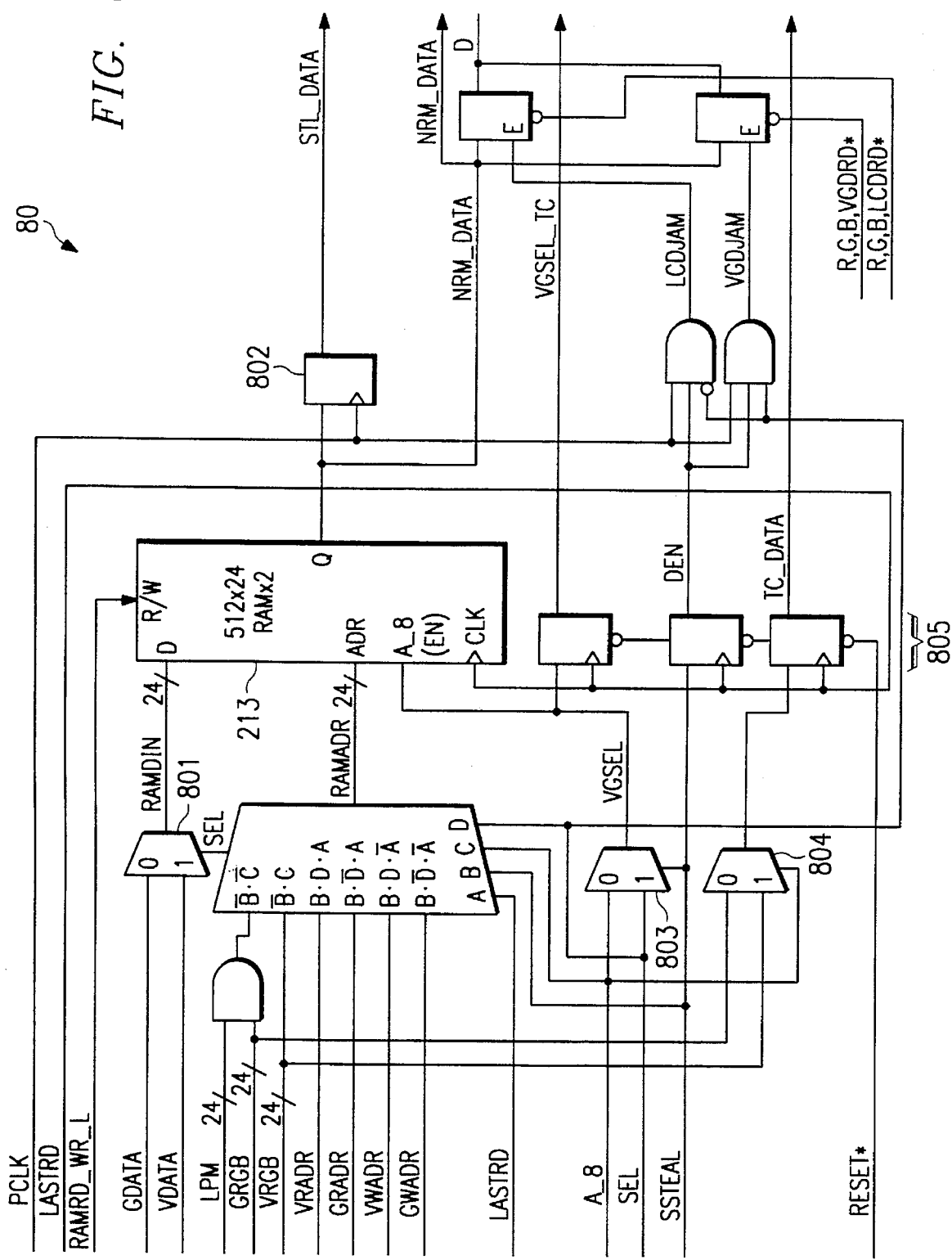

VIDEO PROCESSING METHODS

This is a continuation of application Ser. No. 08/099,194 filed Jul. 29, 1993, now abandoned.

TECHNICAL FIELD OF THE INVENTION

The present invention relates in general to video processing and in particular to video processing apparatus, systems and methods.

CROSS-REFERENCE TO RELATED APPLICATIONS

The following copending and coassigned U.S. patent applications contain related material and are incorporated herein by reference:

U.S. patent application Ser. No. 08/099,083, Attorney Docket No. P3510-P07US, entitled "System And Method For Processing Multiple Received Signal Sources," filed concurrently herewith;

U.S. patent application Ser. No. 08/099,716, Attorney Docket No. P3510-P08US, entitled "System And Method For Displaying Multiple Data Screens To A Single Display Device," filed concurrently herewith;

U.S. patent application Ser. No. 08/098,844, Attorney Docket No. P3510-P09US, entitled "Apparatus, Systems, And Methods For Displaying A Cursor On A Display Screen," filed concurrently herewith;

U.S. patent application Ser. No. 08/099,223, Attorney Docket No. P3510-P10US, entitled "Method And System For Attaching Dynamic Control Codes To Received Real-Time Data Streams," filed concurrently herewith;

U.S. patent application Ser. No. 08/098,846, Attorney Docket No. P3510-P10US, entitled "A System And Method For The Mixing Of Graphics And Video Signals," filed concurrently herewith;

U.S. patent application Ser. No. 08/099,835, Attorney Docket No. P3510-P13US, entitled "Method And System For Achieving Full Monotonic Signal Conversion," filed concurrently herewith;

U.S. patent application Ser. No. 08/099,158, Attorney Docket No. P3510-P14US, entitled "A Voltage Reference And Current Source For Video DAC," filed concurrently herewith; and U.S. patent application Ser. No. 08/098,840, Attorney Docket No. P3510-P16US entitled "Method and System for Generating Dynamic Zoom Codes," filed concurrently herewith.

BACKGROUND OF THE INVENTION

Computer users continue to demand increased performance from the computer systems being made available in the marketplace. Of particular interest have been computer systems with improved display subsystems which provide, among other things, color images, improved image definition, and windowing. Such improvements in display technology not only make the display screens more aesthetically pleasing to the user but also generally make the system easier to use, both important marketing considerations.

Recent development efforts in display technology have been directed at providing display systems which manage and mix both graphics data and video data in a windowing environment. In addition to controlling the content of various sections (windows) of the display screens, these display systems must also establish compatibility between the display device and the graphics and video data sources. In the case of graphics data, the display control circuitry must be capable of driving a given display from data received from various sources (for example, VGA, CGA, VRAM) as well as in varying formats (for example, varying numbers-of bits per pixel and/or varying numbers of bits per each color word in a pixel). Similarly, in the case of video data, the display control circuitry must be capable of handling input data in a variety of formats, such as RGB and YUV, and of varying the numbers of bits per pixel and/or bits per color. All these considerations must be made in view of the ever increasing data transfer speed.

The display interface devices (DACs), which in the past typically linked only the graphics and/or video sources to the system display, in particular face significant demands with the inclusion of video. In the case of video, these interface devices must be capable of receiving the data in varying formats, converting that data as necessary into a digital color data format compatible with the display, and finally converting the digital color data into equivalent analog signals for the actual driving of the display device. Not only must the display interface device provide all these processing features while operating at the demanded high speeds, but also must account for typical differences between the clocking of video data from the video processor to the video frame buffer and the clocking of data to the display unit (the clocking of the display unit is typically controlled by the CRT controller in the graphics controller). Specifically, the video source generates video data using a first time base (clock) while data is transferred to the display using a second time base (clock). Unless this difference in timing is accounted for, in view of all the other considerations, it is difficult to efficiently generate the desired images on the display screen.

The use of first-in/first-out memories (FIFOs) to interface the transfer of video and/or graphics data between processing devices operating on different time bases (clocks) is known in the art. These uses of FIFOs have not however addressed the problems associated with inputing different data and/or control words from different sources, such as a processor and a memory, using a first clock and output the received data/control words with a second clock.

Thus the need has arisen for an improved digital display interface device which provides high speed video processing, especially in a mixed graphics/video display environment.

SUMMARY OF THE INVENTION

According to one embodiment of the present invention, a display interface device is provided which includes inputs for receiving video data words and control codes and a first clock signal generated by an associated video processing device. The interface device also includes a first-in/first-out memory, a video data word clocked into the memory by the first clock and clocked out of the memory by a second clock derived from a clock generated by an associated graphics controller.

According to a second embodiment employing the principles of the present invention, a device is provided for interfacing a video data source with a display, the video data source including a video processor and a video memory. A memory is provided which is operable to store video data words received from the video data, a write of one of the video data words into the memory clocked by a clock signal received from the video processor. Further, video processing circuitry is provided operable to process a given video data word received from the memory and provide signals for driving the display and response, the read of the video data word out of the memory clocked by a second clock signal.

According to a third embodiment according to the principles of the present invention, video data processing circuitry is provided which includes a memory for storing video data words, the input of the video data words synchronized to a first time base and the output of the video data words synchronized with a second time base. A decoder is provided which is operable to receive ones of the video data words output from the memory in a YUV format and output RGB color data words defining selected display pixels in response. A scaler is also provided which is operable to receive the RGB words output from the decoder and provide in response RGB data words defining other display pixels.

According to an additional embodiment embodying the principles of the present invention, a device is provided for interfacing a video data source with a display, the display operable to display images as fields of pixels. Input circuitry is included which is operable to receive data words defining a plurality of selected pixels in the field, the selected pixels disposed along an axis of the field and spaced apart by other pixels of the field. A scaler is also included for selectively providing bilinear interpolation additional data words defining the other pixels in response to the received video data words.

Apparatus systems and methods embodying the principles of the present invention have significant advantages over prior art video interface devices such as DACs. In particular, the embodiments of the present invention provide for the difference between the clocking of video data from a video source, such as a video processor, to a video frame buffer and the clocking of the data to the display unit. Further, the embodiments of the present invention allow for scaling of pixel data by linear interpolation. This novel feature provides the substantial advantage of allowing scaling for either odd or even numbers of undefined pixels on a display screen.

The foregoing has outlined rather broadly the features and technical advantages of the present invention in order that the detailed description of the invention that follows may be better understood, Additional features and advantages of the invention will be described hereinafter which form the subject of the claims of the invention, It should be appreciated by those skilled in the art that the conception and the specific embodiment disclosed may be readily utilized as a basis for modifying or designing other structures for carrying out the same purposes of the present invention, It should also be realized by those skilled in the art that such equivalent constructions do not depart from the spirit and scope of the invention as set forth in the appended claims,

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a–4g are electrical schematic diagrams of the video aligner depicted in FIG. 2;

FIG. 8 is an electrical schematic diagrams of the gamma corrector shown in FIG. 2.

DETAILED DESCRIPTION OF THE INVENTION

The principles of the present invention and their advantages are best understood by referring to the illustrated embodiment depicted in FIGS. 1–8 of the drawings, in which like numbers designate like parts.

Figure 1:
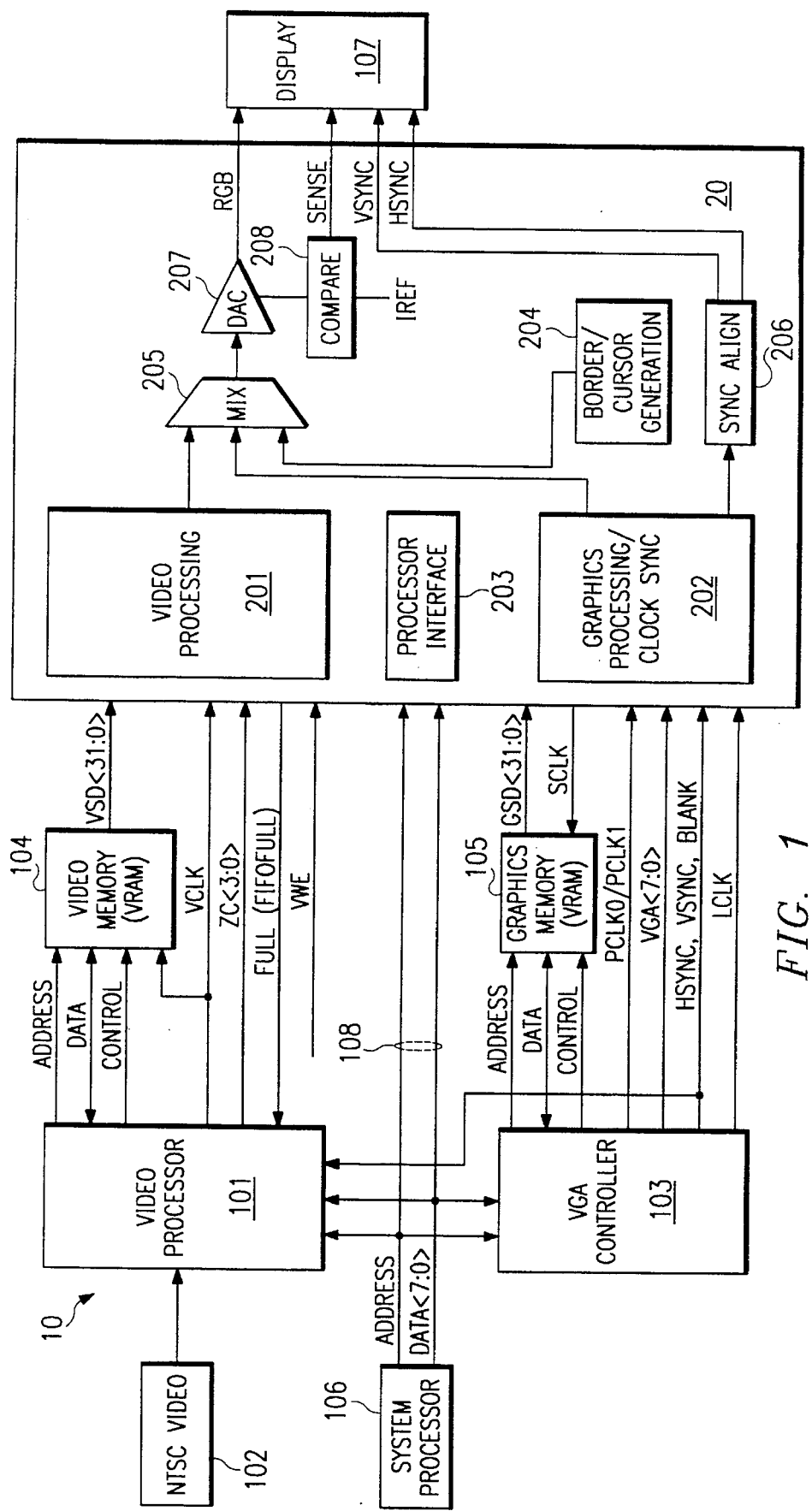
FIG. 1 is a functional block diagram of a data processing system embodying the principles of the present invention.

FIG. 1 is a functional block diagram of a data processing system 10 operable to process and display both graphics and video data. In the illustrated embodiment, the video data processing path includes a video processor 101 which receives and processes digitized NTSC video received from an NTSC video source 102. Video processor 101 may be for example a Pixel Semiconductor CL-PX2070 digital video processor, a complete description of which may be found in "Preliminary Data Sheet CL-PX2070 Digital Video Processor", October 1992, available from Pixel Semiconductor, Dallas, Tex., such data sheet being incorporated herein by reference. Video processor 101 operates in conjunction with a video memory or frame buffer 104. In the illustrated embodiment, video memory 104 consists of one or more video random access memory devices (VRAMs). Video processor 101 and video memory 104 are in turn coupled to a multiple source, digital to analog video converter (DAC) 20 which provides the requisite interface with the system display unit 107. DAC 20, which embodies the principles of the present invention, is discussed in further detail below. Display unit 107 may be for example a raster scan display system operable to display frames of images as fields of lines of pixels, each pixel being defined in color by analog RGB data received from DAC 20.

System 10 also includes a graphics data control path having a graphics controller, such as the depicted VGA controller 103, and a graphics memory or frame buffer 105. Graphics memory 105 may be constructed from one or more video random access memory (VRAM) devices. Graphics data processed through VGA controller 103 and graphics memory 105 are interfaced to display unit 107 through DAC 20.

System (host) processor 106 provides overall control of processing system 10. System processor 106 communicates with DAC 20, graphics processor 103 and video processor via bus 108, which may be for example an ISA bus or an MCA bus.

Video processor 101 and video memory 104 provide video data in any one of a number of YUV and RGB formats to the video processing circuitry 201 of DAC 20. For example, the video data being processed may be 16-bit YUV (4:2:2), 16-bit RGB (5:6:5) or 24-bit RGB (8:8:8). This video data may be tagged or untagged and in the 16-bit modes a pair of pixels may be transferred as a 32-bit word. Video processor 101 loads data into video memory 104 via the VRAM random access port. The zoom codes (control codes) associated with each video data word are delivered to DAC 20 directly with the VCLK. The attachment and timing of the pixel data (video data words) is fully described in copending and coassigned U.S. patent application Ser. No. 08/098,840 (Attorney Docket No. P3510-P10US), incorporated herein by reference. Video serial data (VSD) and zoom codes are provided in raster scan format to video processing circuitry 201. Video processor 101 provides a video clock (VCLK) to video processing circuitry to time the transfer of video data from the video memory 104 into the front end first-in first-out memory of video processing circuitry 201 (discussed further below). In the illustrated embodiment, the video clock is not a free-running clock, as controlled by video processor, and the video write enable signal (VWE) is tied high. In alternate embodiments, the VCLK may be free running and thus a VWE signal may be required.

VGA controller 103 loads graphics memory (frame buffer) 105 with graphics data which in turn is serially provided to graphics processing circuitry 202 of DAC 20. VGA controller 103 also provides either one of two pixel clocks (PCLK0 or PCLK1) and a latching clock (LCLK) for timing the transfer of graphics data from frame buffer 105 to DAC 20. As discussed further below, the pixel clock and its derivatives also control the pipelining of video data through video processing circuitry 201. VGA controller 103 also provides the horizontal sync pulse (HSYNC), the vertical sync pulse (VSYNC), and a display blanking pulse (BLANK) for driving a raster scan display 107. For a complete description of the graphics processing circuitry 202 and the requisite control and clock signals, reference is now made to "Preliminary Data Sheet CL-PX2080 Media-DAC", December 1992, available from Pixel Semiconductor, Inc., Dallas, Tex., such data sheet being incorporated herein by reference. Graphics processing circuitry 202 will also be generally discussed below.

System processor 106 communicates via bus 108 to processor interface 203. Also as discussed in further detail in the CL-PX2080 data sheet, the processor interface 203 advantageously allows communication with either an ISA bus, MSC bus, or the host processor's local bus, or a coprocessor.

DAC 20 also includes a border/cursor generation circuitry 204 which provides a border around the display screen of display unit 107 when desired and a cursor, also on the screen of display 107, as located by the user. A mixer 205 controls the flow and display of either video data from video processing circuitry 201, graphics data from graphics processing circuitry 202 or cursor and/or border data from border/cursor generation circuitry 204. For a complete description of the cursor generation function, reference is now made to co-pending and co-assigned U.S. patent application Ser. No. 08/094,844 (Attorney Docket No. P3510-P09US), entitled "Apparatus, Systems and Methods For Displaying A Cursor On a Display Screen, and filed Jul. 29, 1993, incorporated herein by reference. For a more complete description of mixing (multiplexing) circuitry 205 reference is made to co-pending and co-assigned U.S. patent application Ser. No. 08/098,846 (Attorney Docket No. P3510-P11US), entitled A System and Method for the Mixing of Graphics and Video Signals and filed Jul. 29, 1993, incorporated herein by reference. DAC 20 further includes circuitry 206 for aligning the horizontal and vertical synchronization signals prior to their provision to display 107, digital to analog converters 207 which in the illustrated embodiment convert digital RGB data into analog RGB data for driving display 107, and comparison circuitry 208 which provides a sense signal to display unit 107 from digital to analog converters 207 based on a reference signal (VREF).

Figure 2:
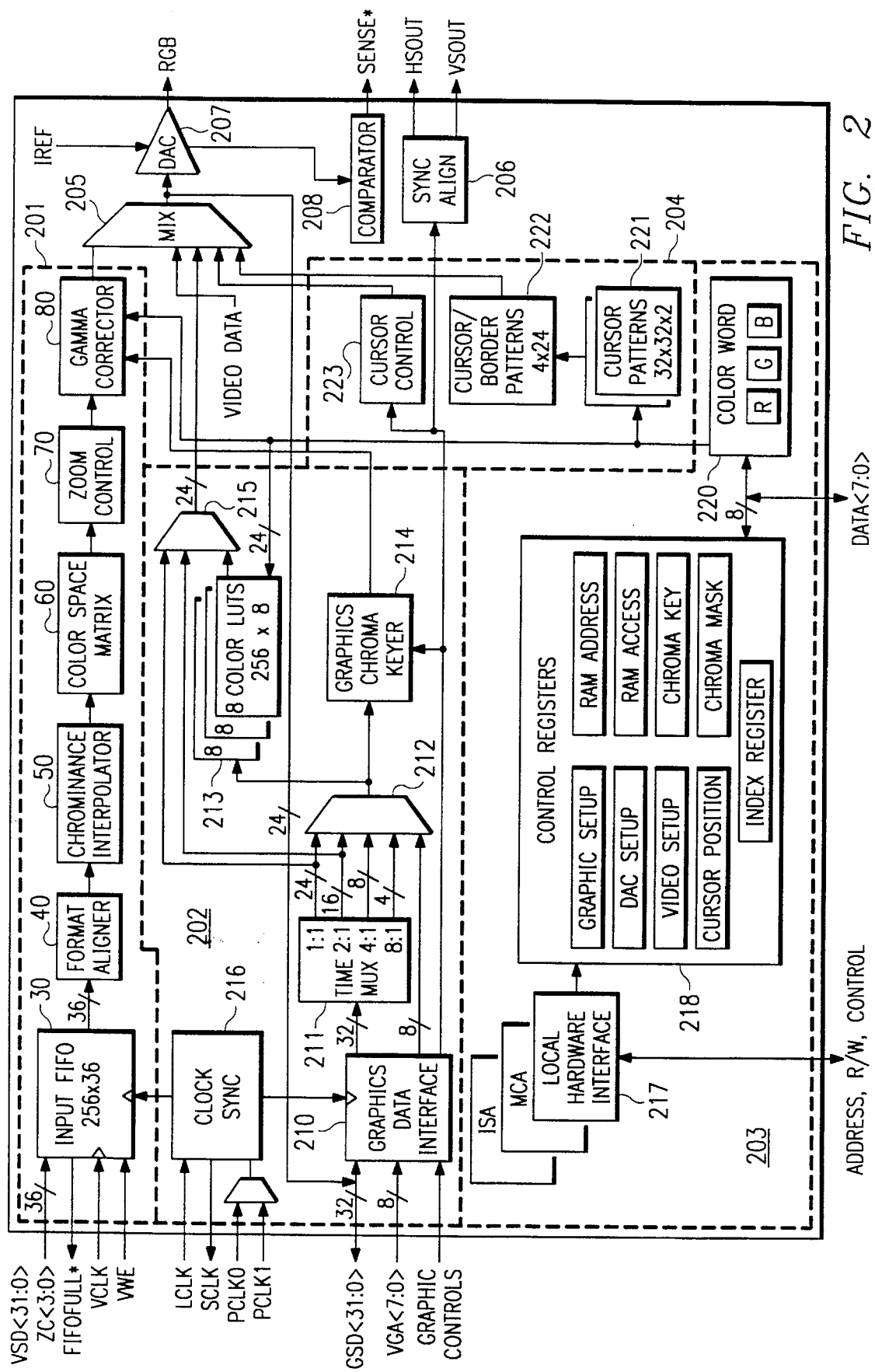
FIG. 2 is a more detailed functional block diagram of the display interface unit (DAC) depicted in FIG. 1.

FIG. 2 is a more complete functional block diagram of DAC 20. Video processing circuitry, embodying the concepts of the present invention, includes input FIFO 30, format aligner 40, chrominance interpolator 50, color space matrix 60, zoom control 70, and gamma corrector 80. Each of these functional blocks of video processing circuitry 201 will be described in further detail below.

Graphics processing circuitry 202 includes an interface 210 for receiving up to 32-bits of graphics data from graphics frame buffer 105, 8-bits of VGA data and the graphic control signals and clocks previously described in connection with FIG. 1. Graphics processing circuitry 202 further includes a time multiplexing circuitry 211 which receives up to 32-bits of graphics data from the interface 210 and controls and times the selection from each 32-bit word of graphics data received of either one 24-bit pixel, two 16-bit pixels, four 8-bit pixels, or eight 4-bit pixels. The output of time multiplexer 211 is presented to multiplexer 212 for either addressing the color look-up table 213 (color palette RAM) or graphics chroma keyer 214. The single 24-bit pixel or the two 16-bit pixels output from time multiplexer 211 may be provided as true color data through multiplexer 215 thereby bypassing color look-up table 213.

Graphics processing circuitry 202 also includes clock sync circuitry 216 which receives up to two pixel clocks (PCLK) and a latch clock (LCLK) and outputs a shift clock to the VRAMs graphics memory 105 and/or graphics controller 103. The graphics shift clock (SCLK) is a divide down of the pixel clock and depends on the operating mode (i.e., the number of bits per pixel/number of pixels being processed for each 32-bit word received from either memory 104 or memory 105).

Processor interface 203 includes interface hardware 217, control registers 218 and data registers 220. ISA/MCA/local hardware interface 217 receives address data, read/write enable signals, and control signals for controlling the transfer of data to and from control registers 218 by system processor 106. Each control register receives control bits from system processor 106 via the data bus portion of bus 108. The bits stored in control registers 218 control the operation of DAC 20, as selected by the user through the host processor 106. Color data words are received through registers 220 and are used to load the gamma corrector RAM (discussed further below), the color look-up table RAM 213 and the RAMs and registers of cursor/border generation circuitry 204 used to store pattern color data for the display of a cursor and a border patterns.

In the illustrated embodiment, border/cursor generation circuitry 204 includes a 32×32×2 random access memory (as discussed below, this RAM may be of an alternate size and/or configuration) which holds a plurality of pairs of bits each used to select color data stored in four 24-bit registers 222 defining the boundaries and colors of the cursor and/or border as desired by the user. Cursor control circuitry 223 controls the location of the cursor on the screen of display system 107.

Figure 3:
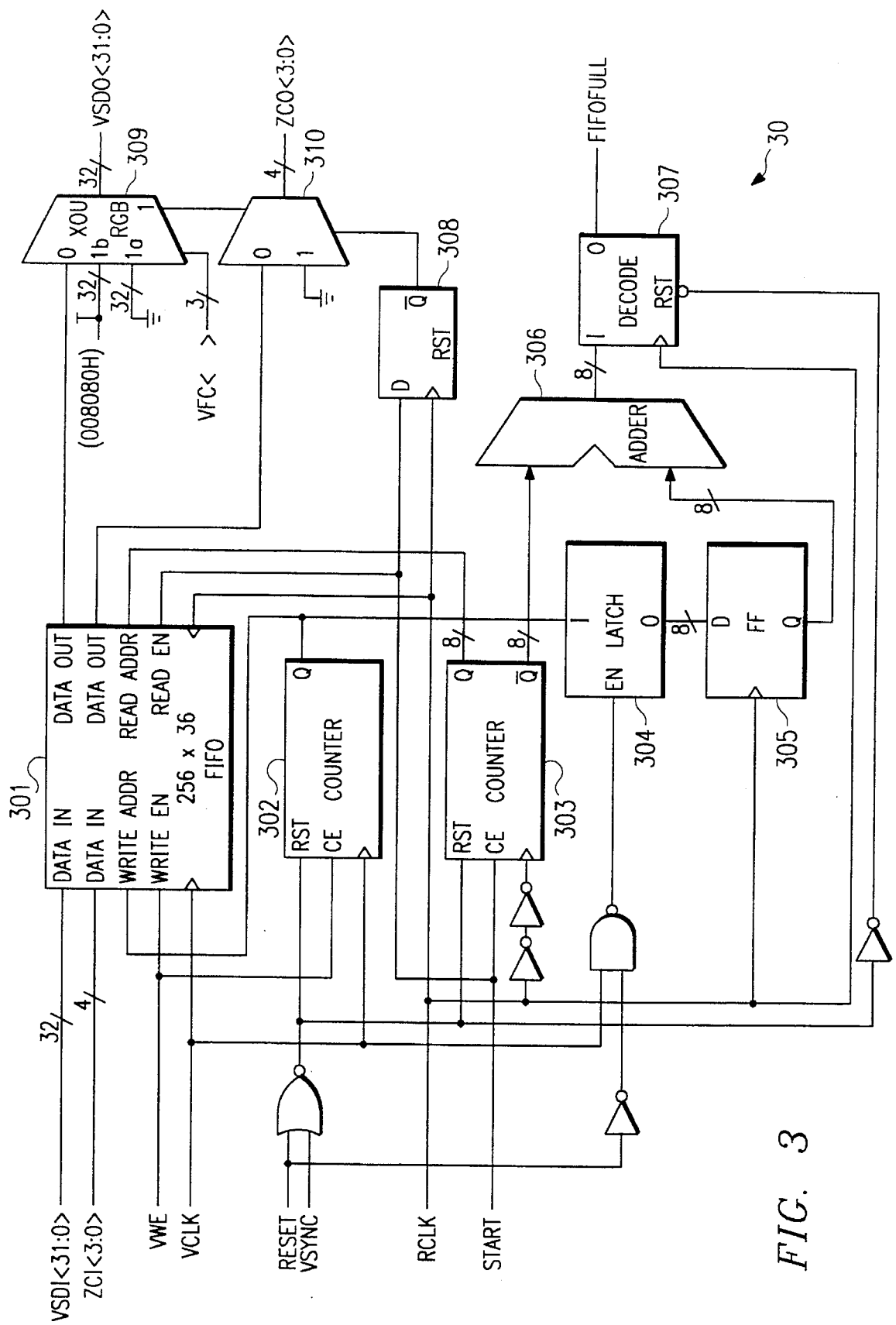
FIG. 3 is an electrical schematic diagram of the input FIFO depicted in FIG. 2.

FIG. 3 is a schematic diagram of input FIFO 30 depicted in FIG. 2. Input FIFO 30 includes a first in/first out (FIFO) memory 301. In the illustrated embodiment, FIFO 301 is arranged in a 256×36 organization (i.e., 36 planes of 256 bit locations each). This allows 32-bits of video serial data (VSDI) from video memory 104 to be stored along with an associated 4-bits of zoom codes (ZCI) (received directly from video processor 101) at the same location. Writes into FIFO 301 are enabled by the video write enable signal (VWE) received from video processor 101, with the data clocked in by the video clock (VCLK), also received from video processor 101. In the illustrated embodiment, data is written with each rising edge of the VCLK (VWE is always active or high). Write addresses for the data input from video memory 104 are generated by a write counter 302. Write counter 302 resets with each VSYNC pulse indicating the start of each new field of video data, or with a general hardware reset signal (RESET). Counter 302 is clocked by the video clock (VCLK).

Reads from the locations in FIFO 301 each retrieve 36-bits, 32-bits being video data and 4-bits being the associated zoom codes. Reads are enabled by the signal start which indicates that data is being processed for generation of a pixel within the active window of the display screen on display unit 107. A description of the active window as it relates to the display blanking signal and border can be found in the CL-PX2080 data sheets. The display screen is active when the display blanking signal (Blank) is inactive; the active video window of display screen occurs when the control signal BORDER* is inactive (i.e., within a border around the periphery of the screen, if such a border is being generated). Reads from the FIFO 301 are clocked by the read clock (RCLK) the period of which is equivalent to the pixel clock (PCLK) divided by two when the incoming 32-bit video data words include two pixels (i.e., 16-bit pixels) and equivalent to the PCLK when each incoming word includes only on pixel (i.e., a 24-bit pixel). A counter 303 provides addresses to the read address input of FIFO 301. Counter 303, similar to counter 302, is reset with either the hardware reset signal (RESET) or the display vertical sync pulse. Read counter 303 is enabled during the screen active window by the start signal and clocked by the read clock. The Q output (8-bits) from counter 303 provide the addresses to FIFO 301.

As each write address is generated by write address counter 302, it is stored in a latch 304. Latching during normal operation is performed with the low (inactive periods) of the VCLK. On the next cycle of the read clock (RCLK), the read count held in latch 304 is clocked through an array of flip-flops 305 to one input of adder 306. At the same time, the 8-bits at the Q bar output of read counter 303 is provided at the other input to adder 306. The addition of the inverse of the read count from counter 303 and the write count clocked out of latch 304 are added, to effect a subtraction with the result provided to decode circuitry 307. In the illustrated embodiment, decoder 307 determines when the write address count less the read address count exceeds 240, at which time the signal FIFOFULL* is generated. Control signal FIFOFULL* is a handshake command which indicates, to a video processor 101 such as a Pixel Semiconductor CL-PX2070, that data is being read out of the FIFO 301 at a slower rate than it is being written in and therefore the FIFO 301 is filling. As a consequence of the generation of FIFOFULL*, video processor 101 can slow down or halt the generation and transfer of video data to the video frame buffer 104.

Flip flop 308 and multiplexers 309 and 310 are primarily used to output the 32-bits of video data (VSDO) and 4-bits of zoom codes (ZC0) during the active window of the display screen. Before the start of display of the next field, 00000000h (black), is fed into chroma interpolator 50 when RGB data is being passed. When YUV data is being passed 008080H is fed to chroma interpolator 50 such that chroma interpolator 50 sees "black-YUV" for interpolation.

FIGS. 4a–d are schematic diagrams of video aligner 40. Video (format) aligner 40 of the illustrated embodiment accepts 32-bits of data (VSD[31:0]) in any one of the various formats described in Table I, along with the associated 4-bits of zoom codes (ZC[3:0]). Format aligner 40 uses a series of pipeline registers 401–406 and multiplexers 407–415 to reformat the input data (VSD[31:0]) to provide two parallel 24-bit pixels (a total of 48 bits) to chrominance interpolator 50. Format aligner operates under the control of control circuitry 416 which is shown in detail in FIG. 4g. Control circuitry 416 operates on eight video format control bits (VFC[7:0]) which are taken from the video setup register of control registers 218 (FIG. 2). Clocking is performed by clock CLK which may be either equivalent to the pixel clock or a divide by two of the pixel clock, as discussed below.

As is indicated in Table I, each incoming 32-bit data word (VSD[31:0]) may include either one pixel of more than 16-bits (typically 24 bits) or two packed pixels of 16-bits or less each. In the single pixel mode, such as when 24-bit pixels are being received at input VSD[31:0], two 32-bit words, which are received in serial from video memory 104, are used to provide two 24-bit pixels, (pixel 1 and pixel 2) for output to chroma interpolator 50. It is important to note that in this "single pixel mode," the controlling clock (CLK) is equivalent to the pixel clock (PCLK). In the double pixel mode, such as when each 32-bit input word is packed with two 16-bit pixels of either YUV or RGB data, the two 24-bit pixels (pixel 1 and pixel 2) provided at the aligner outputs are generated by reformatting the single 32-bit input word. In this case, the controlling clock (CLK) is a divide by two of the pixel clock (PCLK).

It should be noted that in Table 1, the notation is based on alignment to resultant 8-bit pixel values, where bit 7 is the MSB. For example, in Table 1, if R-7, R-6, R-5, and R-4 are specified, then data is left-justified out of the pipeline with the three LSBs padded with zeros. Similarly, if two 16-bit RGB words are received, the LSBs for each red, blue and green are padded by zeros to provide two 24-bit pixels of 8:8:8 formatting. Also, when y0 and y1 are specified in the same input frame, y0 is the first luminance component in time.

Figure 4A:
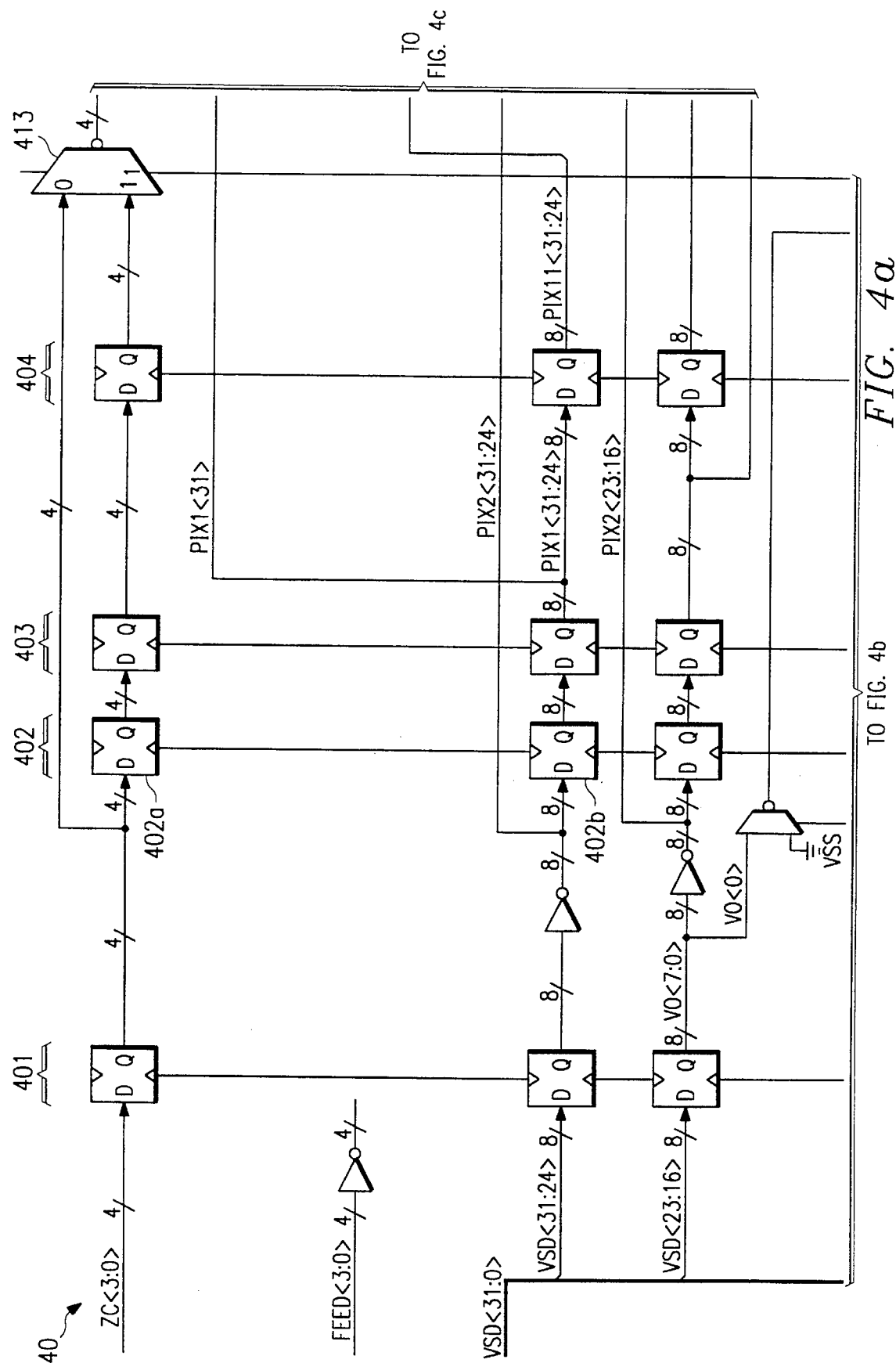
Figure 4B:
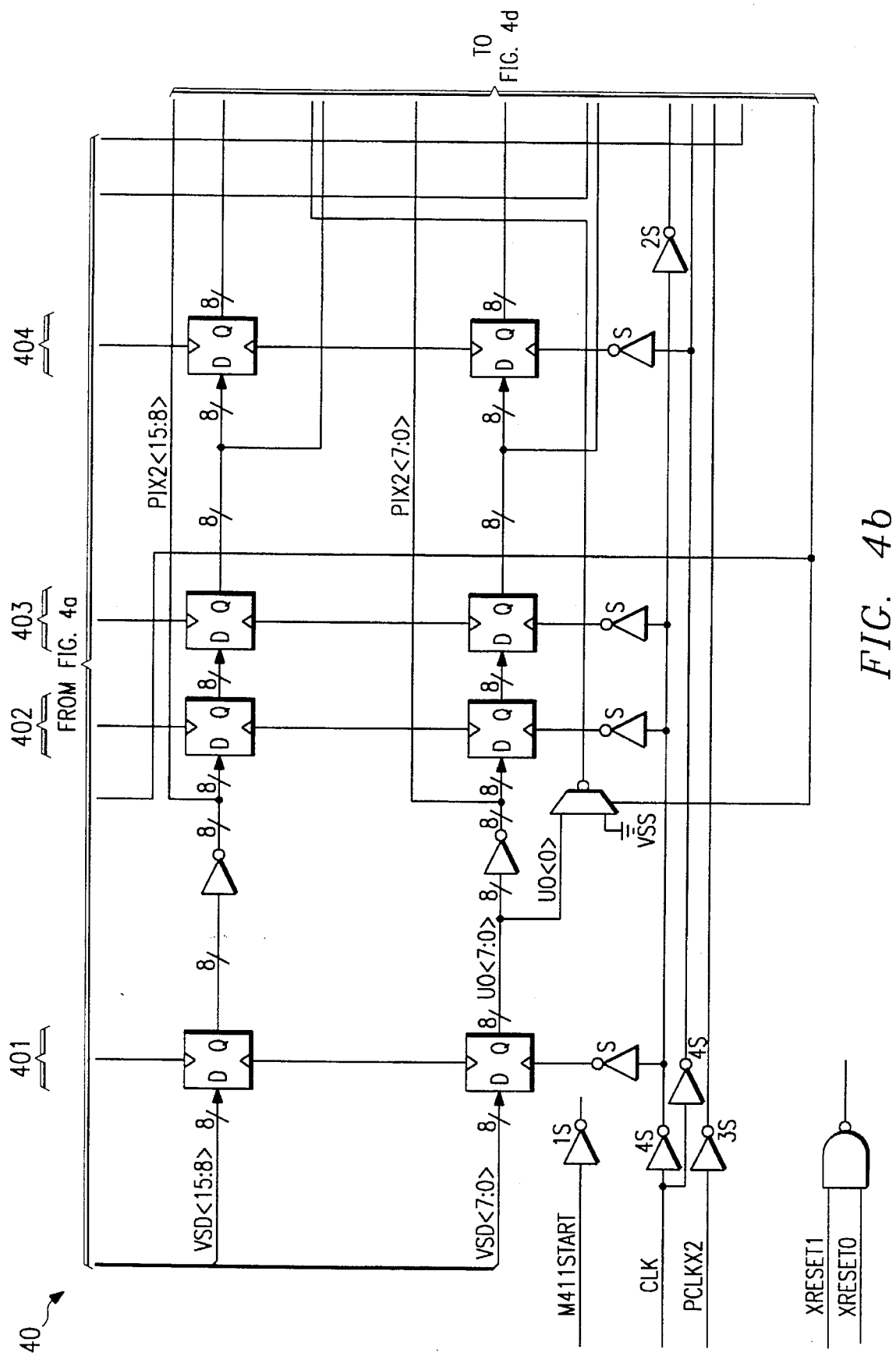
Figure 4C:
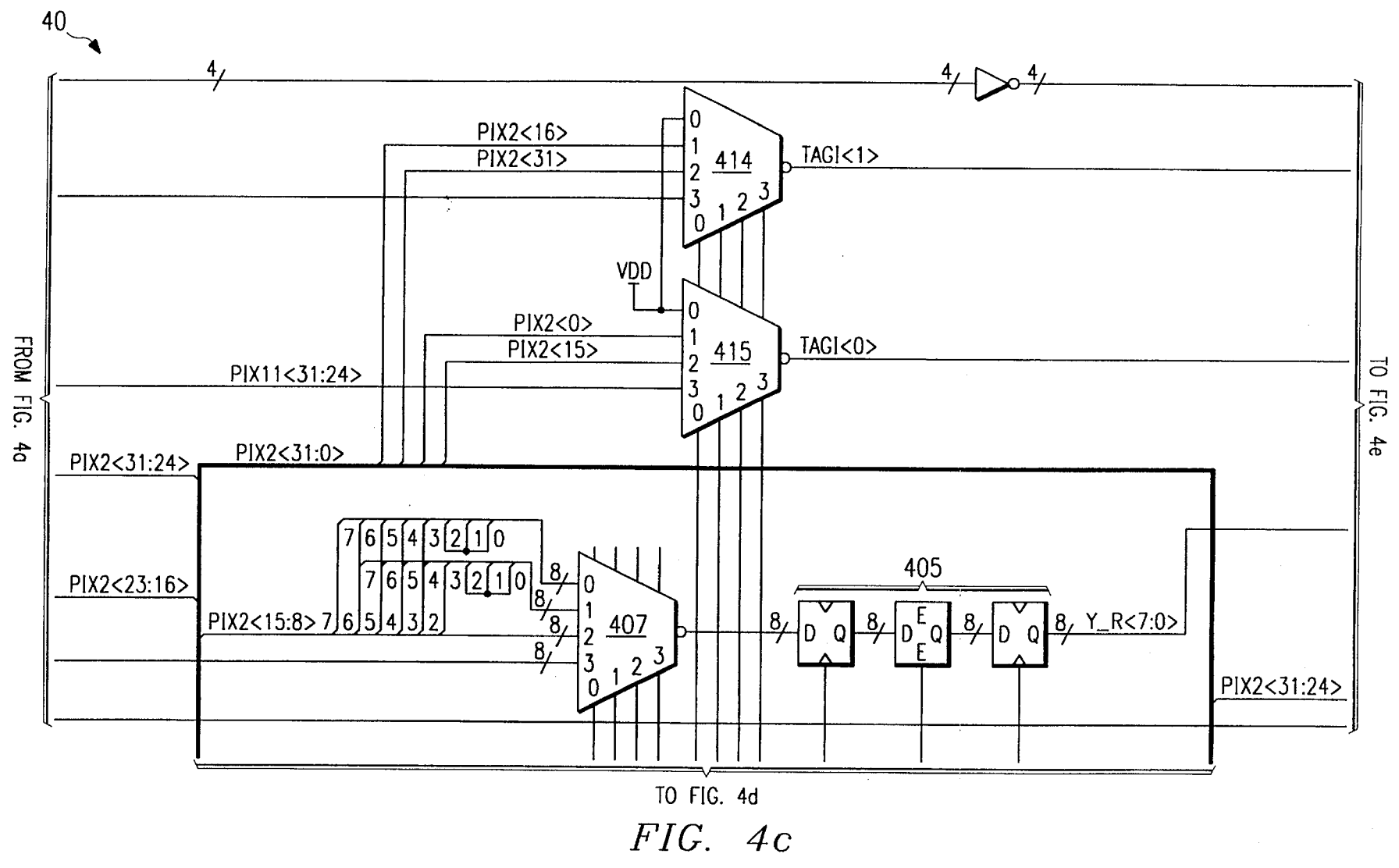
Figure 4D:
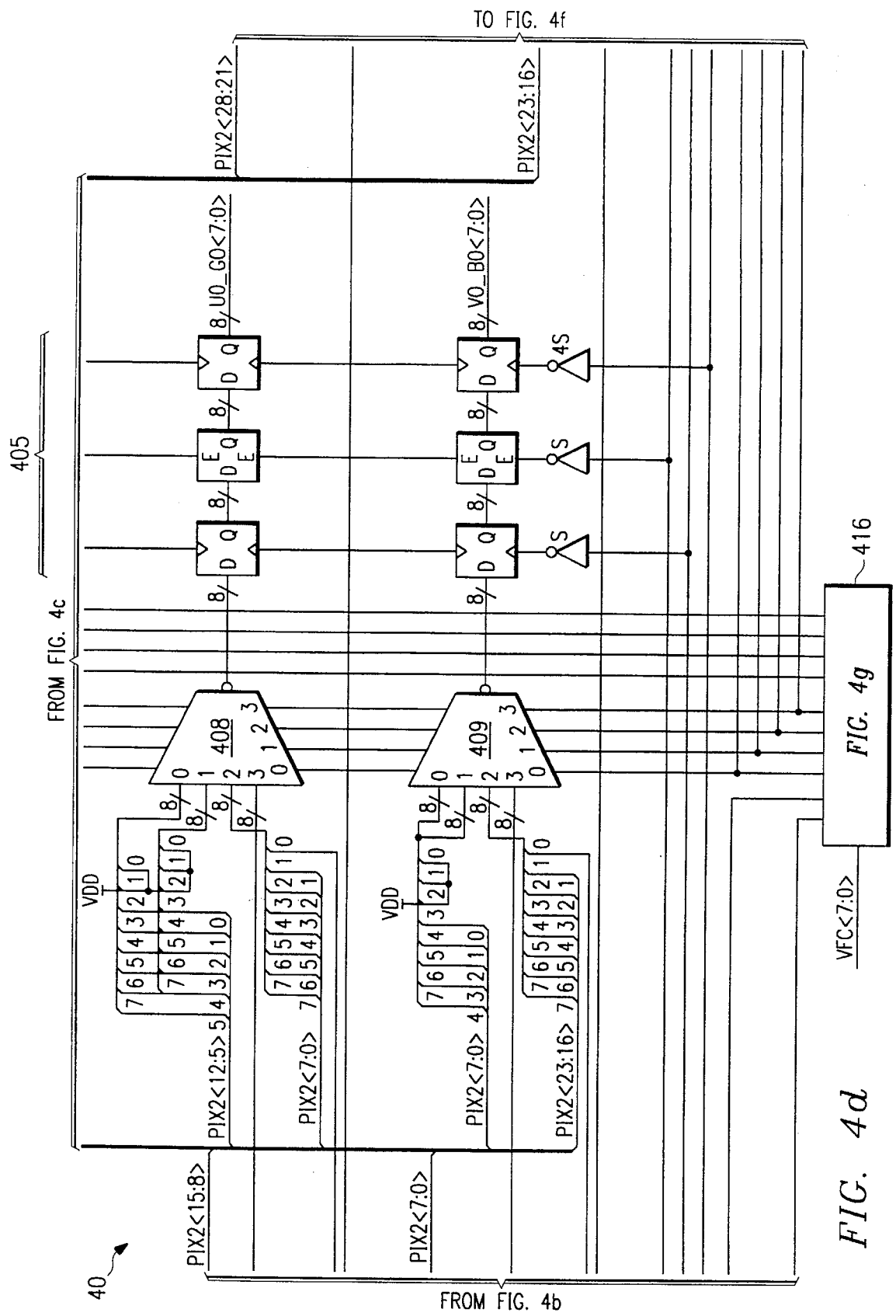
Figure 4E:
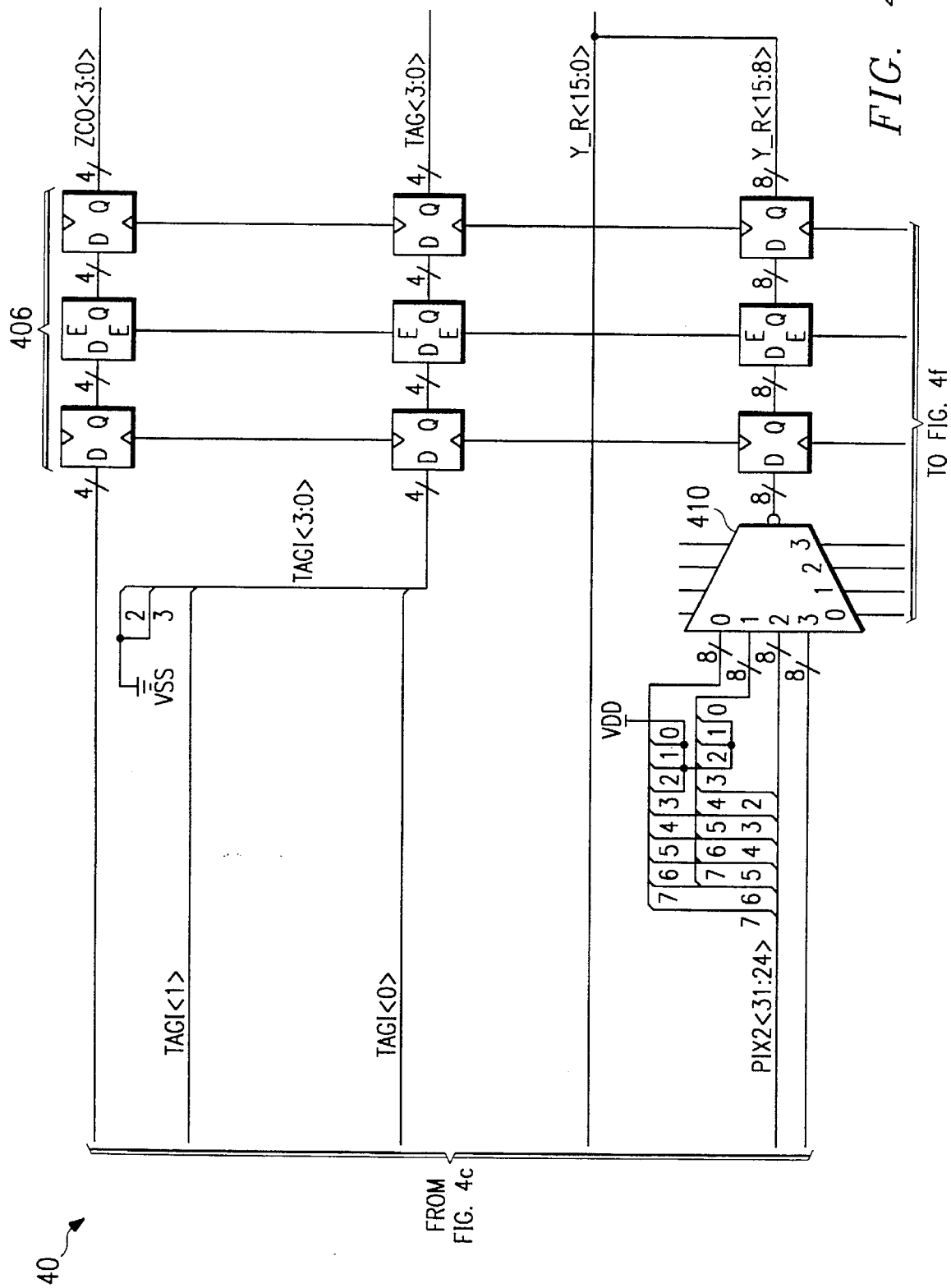
Figure 4F:
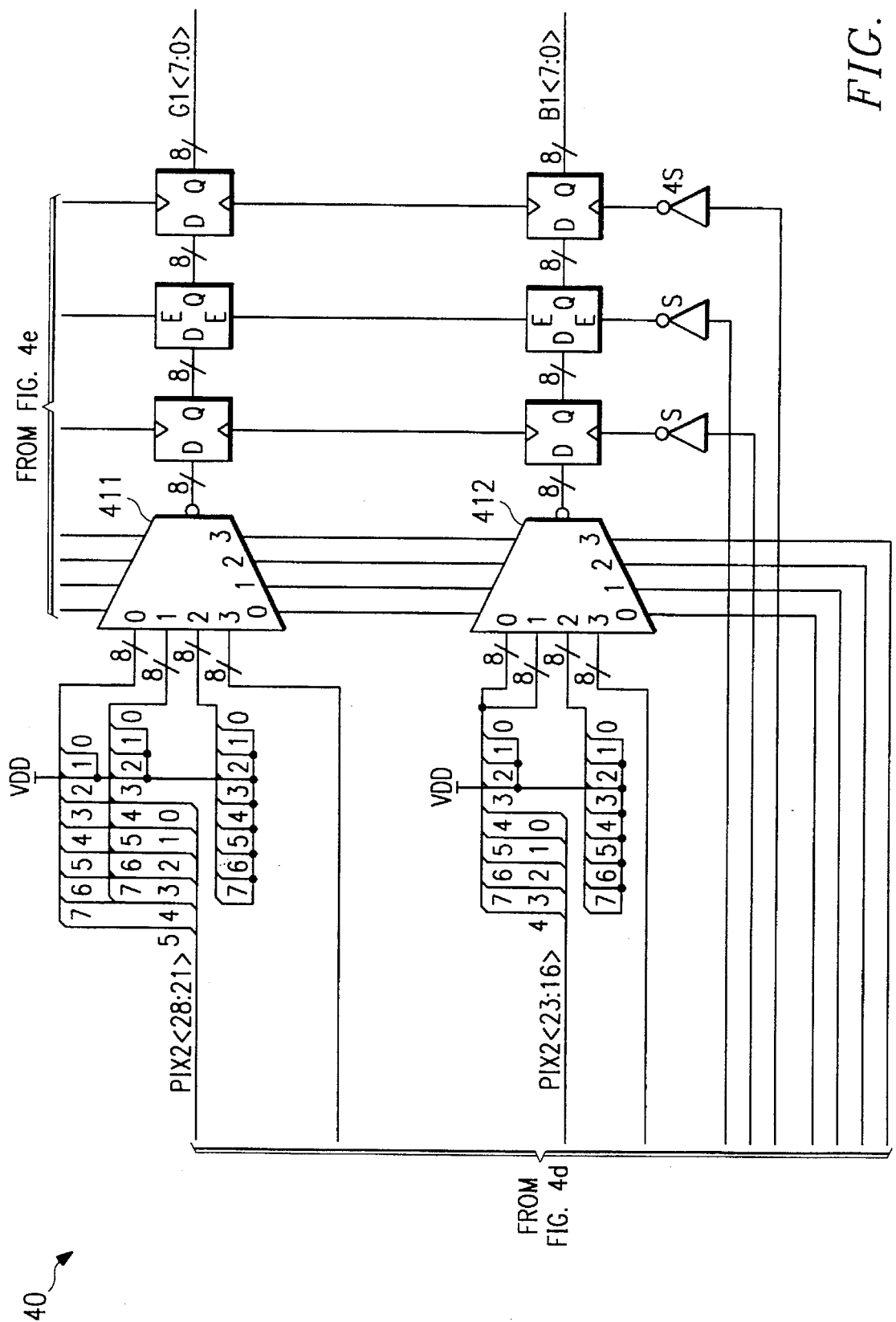
Figure 4G:
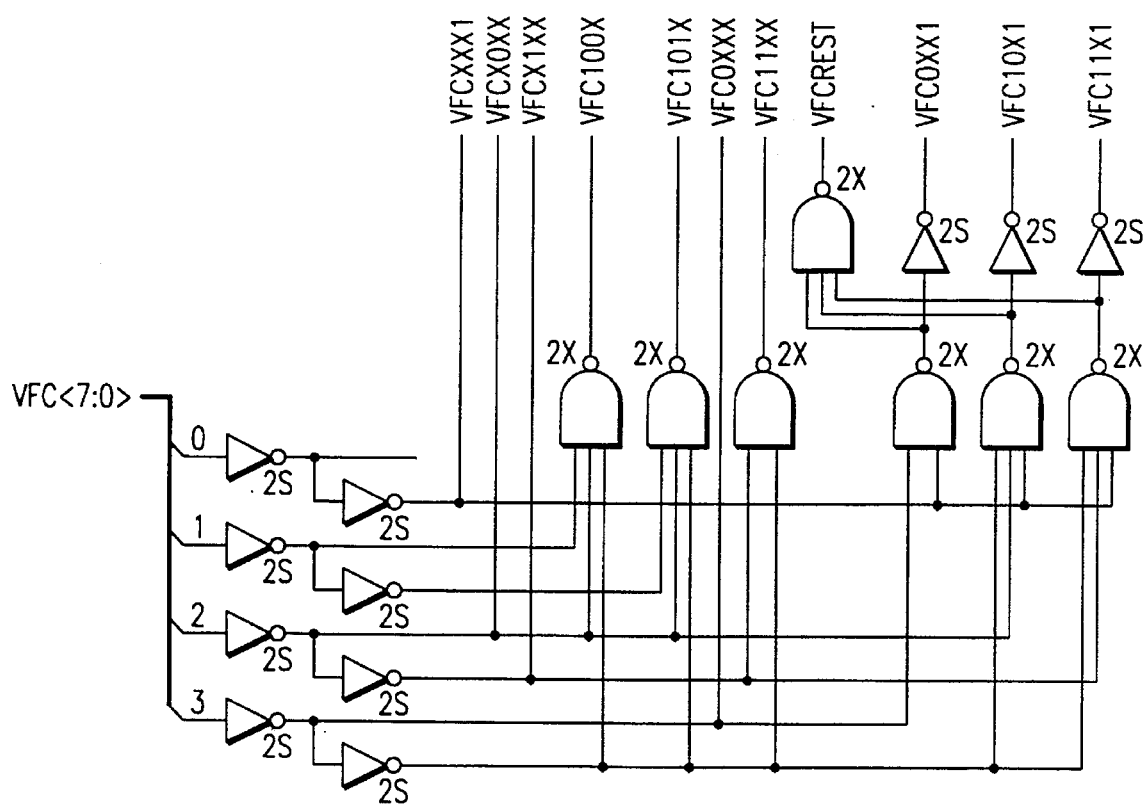

In FIG. 4a it should be recognized that each set of registers 401–406 is fabricated from a plurality of flip flops or latches. Thus, each block in a given register represents a number of flip flops. For example, the blocks representing the latches in registers 401–406 in the zoom code pipeline, such as block 402a, each represent four parallel flip flops or latches since four zoom code bits (ZC[3:0]) are being processed. Similarly, in the pipeline register passing video data, such as the path controlling the 8-bits (VSD[31:24]), each flip flop or latch block such as block 402b, represents eight parallel flip flops or latches since each parallel data path (VSD[31:24]), (VSD[23:16]), (VSD[15:8]), or (VSD[7:0]) handles 8-bits in parallel.

The outputs of video format aligner which couple to chromainterpolator 50 can be described as follows. Output Y_R[15:0] outputs the fifteen output bits for two pixels (8-bits each) of either luminance (Y) or red (R) RGB data depending on whether YUV or RGB data was received from FIFO 30. U0_G0[7:0] are the 8-bits of pixel 1 of either chrominance (U) or green (G) RGB data. Output V0_B0[7:0] are 8-bits of either chrominance (V) or blue (B) RGB data for pixel 1. Output G1[7:0] represents 7-bits of green (G) RGB data for pixel 2 and output B1[7:0] represents the 8-bits of blue (B) RGB data for pixel 2. It should be noted that by convention the chroma components U1 and V1 (for pixel 2) are not provided but are generated in the chroma interpolator 50. When a YUV data is being output, the bits provided at outputs G1[7:0] and B1[7:0] are "don't cares."

Figure 5A:
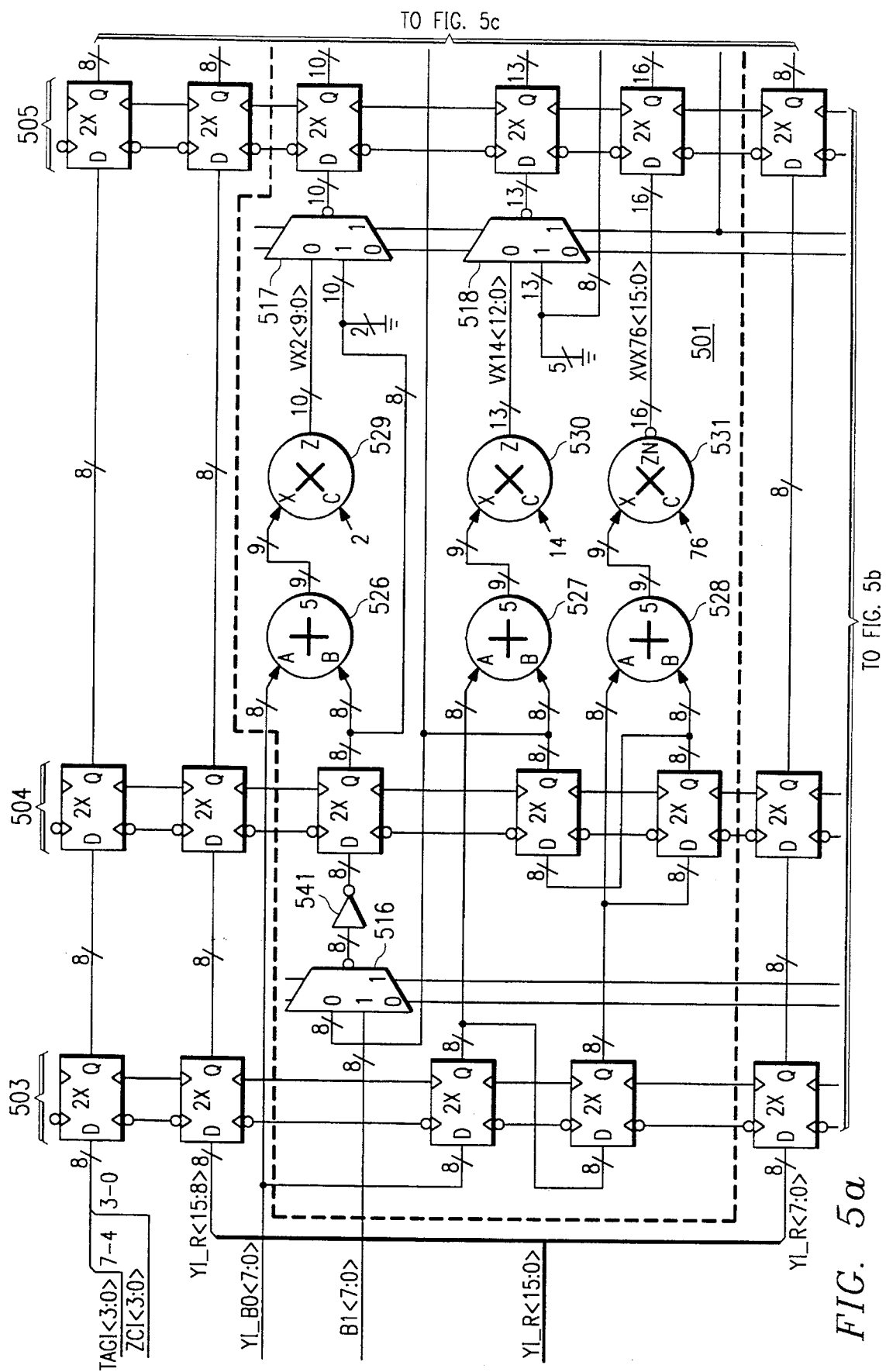
FIGS. 5a–5d are electrical schematic diagrams of the chrominance interpolator depicted in FIG. 2.
Figure 5B:
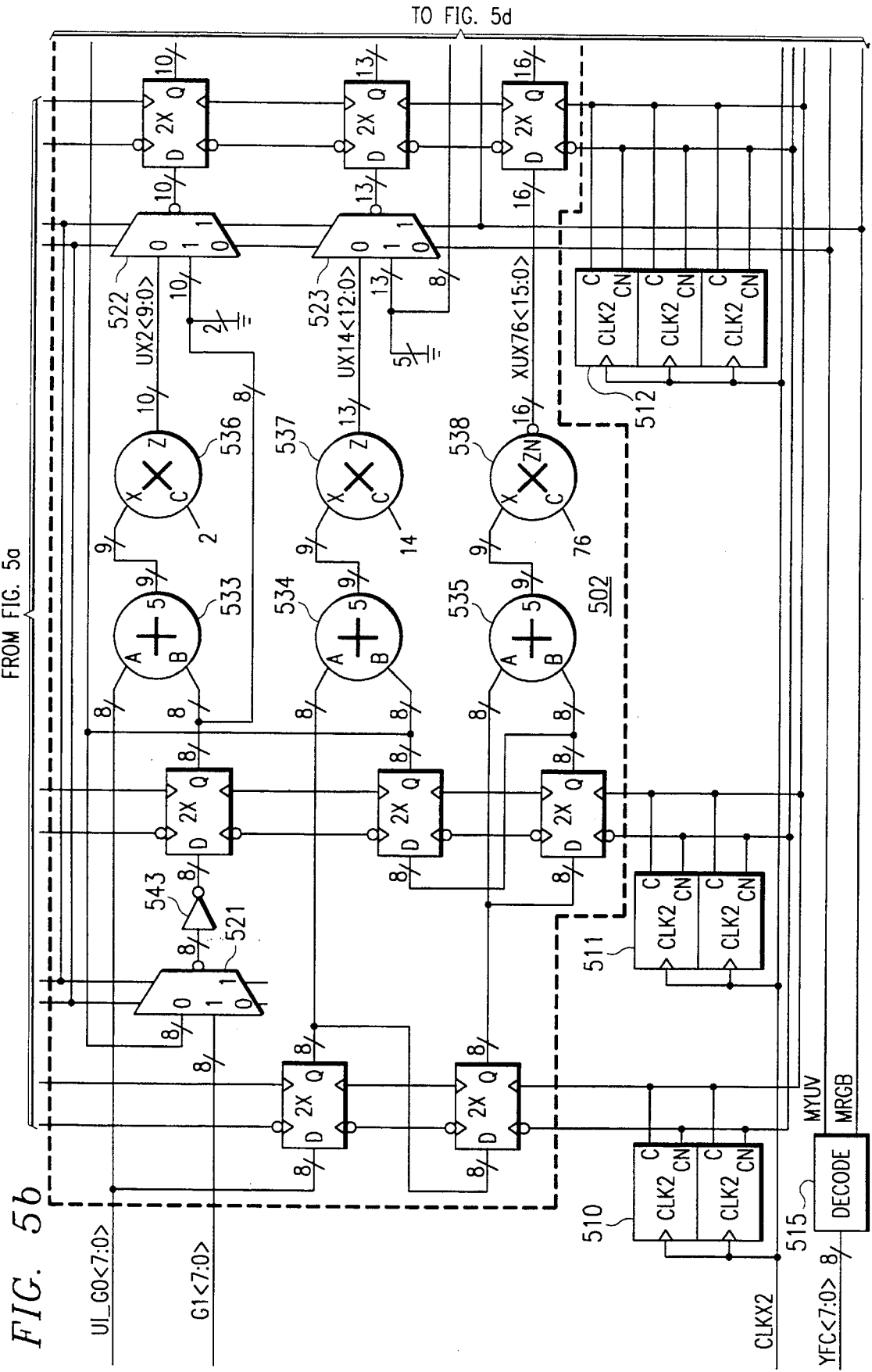
Figure 5C:
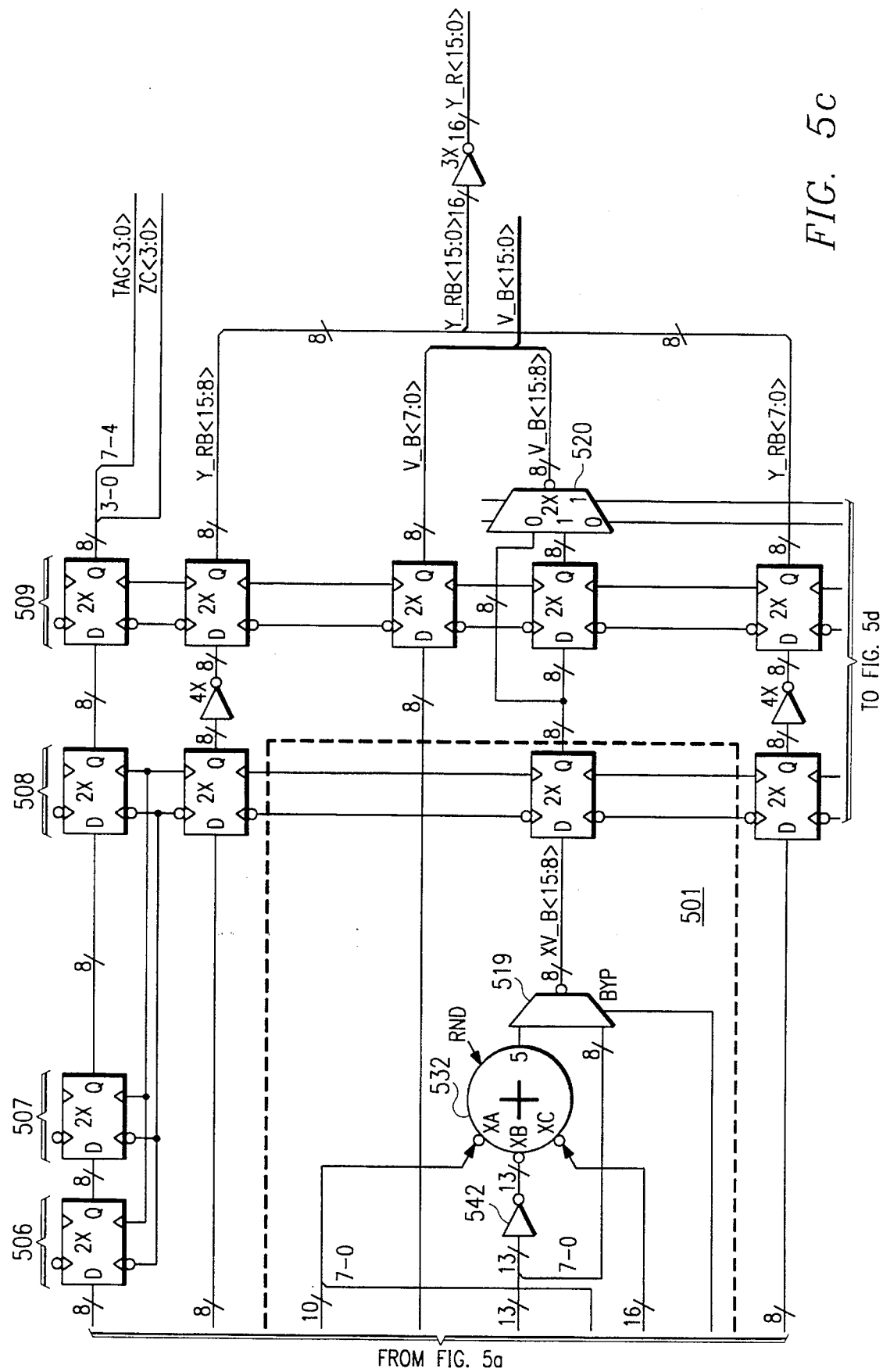
Figure 5D:
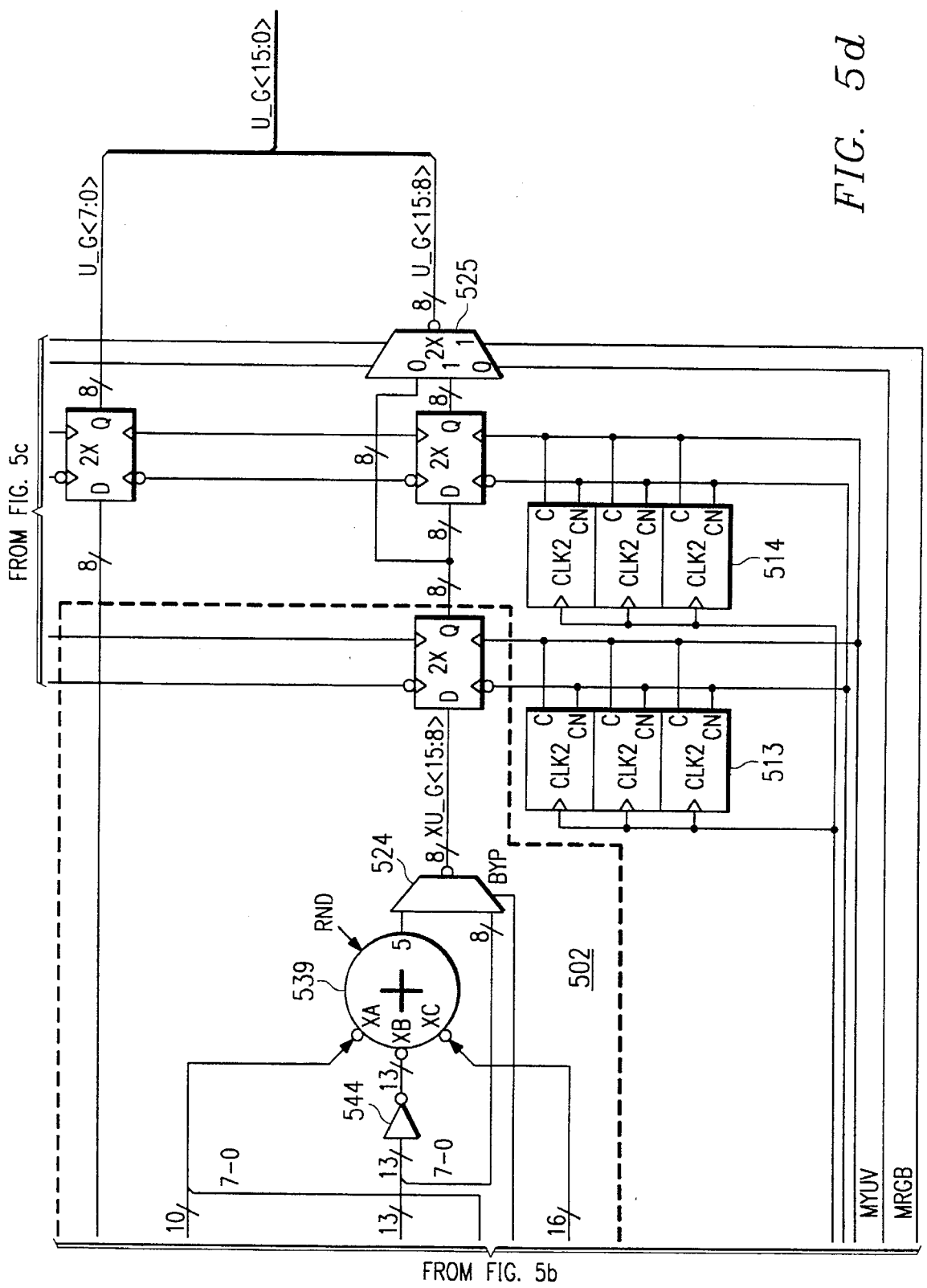

FIGS. 5a–5d are schematic diagrams of chrominance interpolator 50. As discussed briefly above, for each pair of YUV pixels $Y_0U_0V_0$ and $Y_1U_1P_1$, the V1 and U1 chrominance components of the second pixel are not provided by convention. Thus, a chrominance interpolator 50 such as that depicted in FIG. 5d is required. In essence, chromainterpolator 50 takes data from a series of pixels before and after the current pixel to be completed by interpolation.

Chroma interpolator 50 includes two filter/interpolator circuits 501 and 502 for generating the missing $U_1$ and $V_1$ components from a given pixel pair when operating on YUV data. Timing through chroma interpolator 50 is maintained by a series of pipelined registers 503–509. The clocking through pipeline registers 503–509 is maintained by corresponding clock drivers 510–514. The controlling clock (CLKX2) is a divide by two of clock (CLK) discussed above. Decode circuitry 515 receives eight video format control bits (VFC) from the video setup control register of control registers 218 (FIG. 2). From the eight video format control bits, decoder 515 configures chroma interpolator 50 to process either RGB data or YUV data.

In the case of RGB data, the data is pipelined directly through chroma interpolator 50 without change, as are the tag data (TAGI) and zoom codes (ZC). The red data received at inputs YI_R[15:0] is sent directly to output YR[15:0] through pipeline registers 503, 504, 505, 508 and 509. The green and blue data received at inputs V1_B0[7:0] and U1_G0[7:0] are passed directly to outputs V_B[15:0] and U_G[15:0] respectively through two latch delays in register 503, two latch delays in register 504 and one latch delay in register 509. Blue data received at input B1[7:0] is passed through to output V_B[15:0] via multiplexer 516, one latch delay in register 504, multiplexer 517, multiplexer 518, two clock delays in register 505, multiplexer 519, one clock delay in register 508, one clock delay in register 509 and multiplexer 520. Similarly, green data received at input G1[7:0] is passed unchanged to output U_G[15:0] via multiplexer 521, one clock delay in register 504, multiplexer 522, multiplexer 523, two clock delays in register 505, multiplexer 524, one clock delay each in registers 508 and 509, and multiplexer 525.

When YUV data is being processed, the Y data received at input YI_R[15:0] is passed directly to output Y_R[15:0] after five clock delays (when CLK equals PCLK/2 or 10 clock delays when CLK equals PCLK) through registers 503, 504, 505, 508 and 509. The U and V chrominance components for pixel 1 (i.e., $U_0$ and $V_0$) passed directly to outputs V_B[7:0] and U_G[7:0] after two delays in register 503, two clock delays in register 504 and one clock delay in register 509 (i.e., a total of five clock delays). The U and V components for pixel 2 (i.e., U1 and V1) to be provided at outputs V_B[15:8] and U_G[15:8] are then provided by interpolation/filter circuits 501 and 502. U and V are calculated in parallel to maintain high processing speeds (clock rates of 135 MHz and above).

The primary components of interpolator circuit 501 ($U_1$ interpolation) include the latches of registers 504 and 503, a first series of adders 526–528, a corresponding triplet of multipliers 529–531 and a three-way adder 532. Similarly, interpolator circuitry 502 relies on the latches of registers 503 and 504, three two-way adders 533–535, a corresponding triplet of multipliers 536–538 and a three-way adder 539. Interpolator circuitry 501 further includes a pair of inverters 541 and 542 and interpolator 502, a pair of corresponding inverters 543 and 544.

Interpolators 501 and 502 interpolate in accordance with the formula $$Z_0 = \tfrac{2}{128}Z^{-5} - \tfrac{14}{128}Z^{-3} + \tfrac{76}{128}Z^{-1} + \tfrac{76}{128}Z^{+1} - \tfrac{14}{128}Z^{+3} + \tfrac{2}{128}Z^{+5}$$

where:

$Z_0$ is the data being currently interpolated;

$Z^{-1}, Z^{-3}, Z^{-5}$ are data from odd data points prior in time; and $Z^{+1}, Z^{+3}, Z^{+5}$ are data from odd data points subsequent in time.

In the illustrated embodiment where the components $$U_1 = \tfrac{2}{128}U_{-4} - \tfrac{14}{128}U_{-2} + \tfrac{76}{128}U_0 + \tfrac{76}{128}U_2 - \tfrac{14}{128}U_4 + \tfrac{2}{128}U_6;$$

and $$V_1 = \tfrac{2}{128}V_{-4} - \tfrac{14}{128}V_{-2} + \tfrac{76}{128}V_0 + \tfrac{76}{128}V_2 - \tfrac{14}{128}V_4 + \tfrac{2}{128}V_6;$$

Figure 6A:
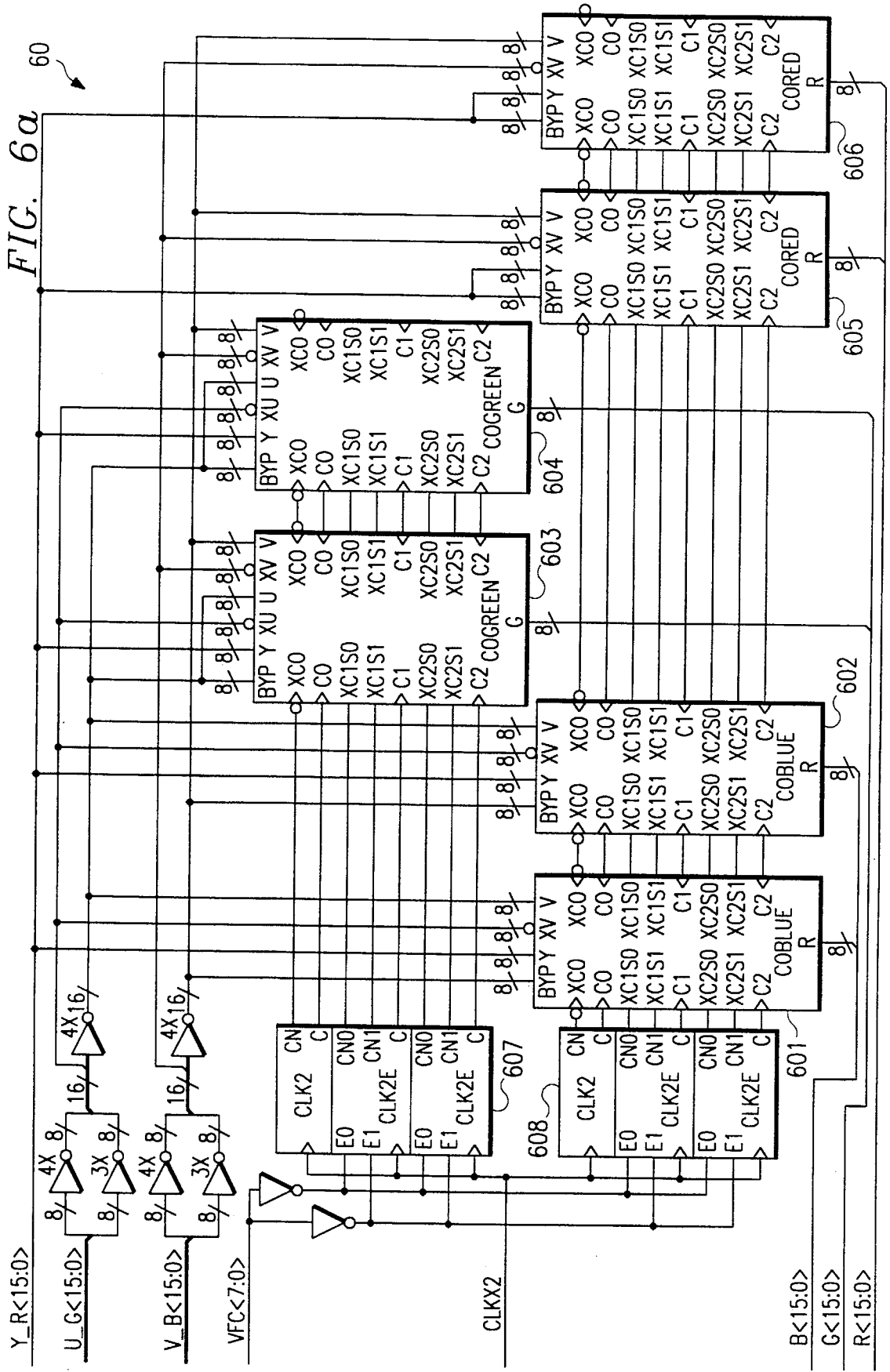
FIGS. 6a–6d are electrical schematic diagrams of the color space matrix depicted in FIG. 2.

FIG. 6a is a top level functional block diagram of color space matrix 60. In general, color space matrix 60 accepts input from the chrominance interpolator 50, when YUV pixel data is provided, converts the YUV pixels to RGB pixels. As with the previously described circuitry, color space matrix 60 operates on 48-bits of data representing two 24-bit pixels in an 8:8:8 format. Blue conversion circuits 601 and 602 provide color conversion of the input YUV data to provide the blue components of two RGB pixels. Similarly, green conversion circuits 603 and 604 respectfully convert the incoming YUV data into the green components for two RGB pixels while a red conversion circuits 605 and 606 convert the incoming YUV data into the red components of two RGB pixels. It should be noted that when RGB data is pipelined into inputs Y_R, U_G and V_B, that no conversion is required and therefore the data is directly passed without change from chrominance converter 50 to zoom controller 70. The operation of converters 601–606 is controlled by five bits from the video setup register of control registers 218 (FIG. 2) as provided through clock drivers 607–608.

Figures 1, 6B:
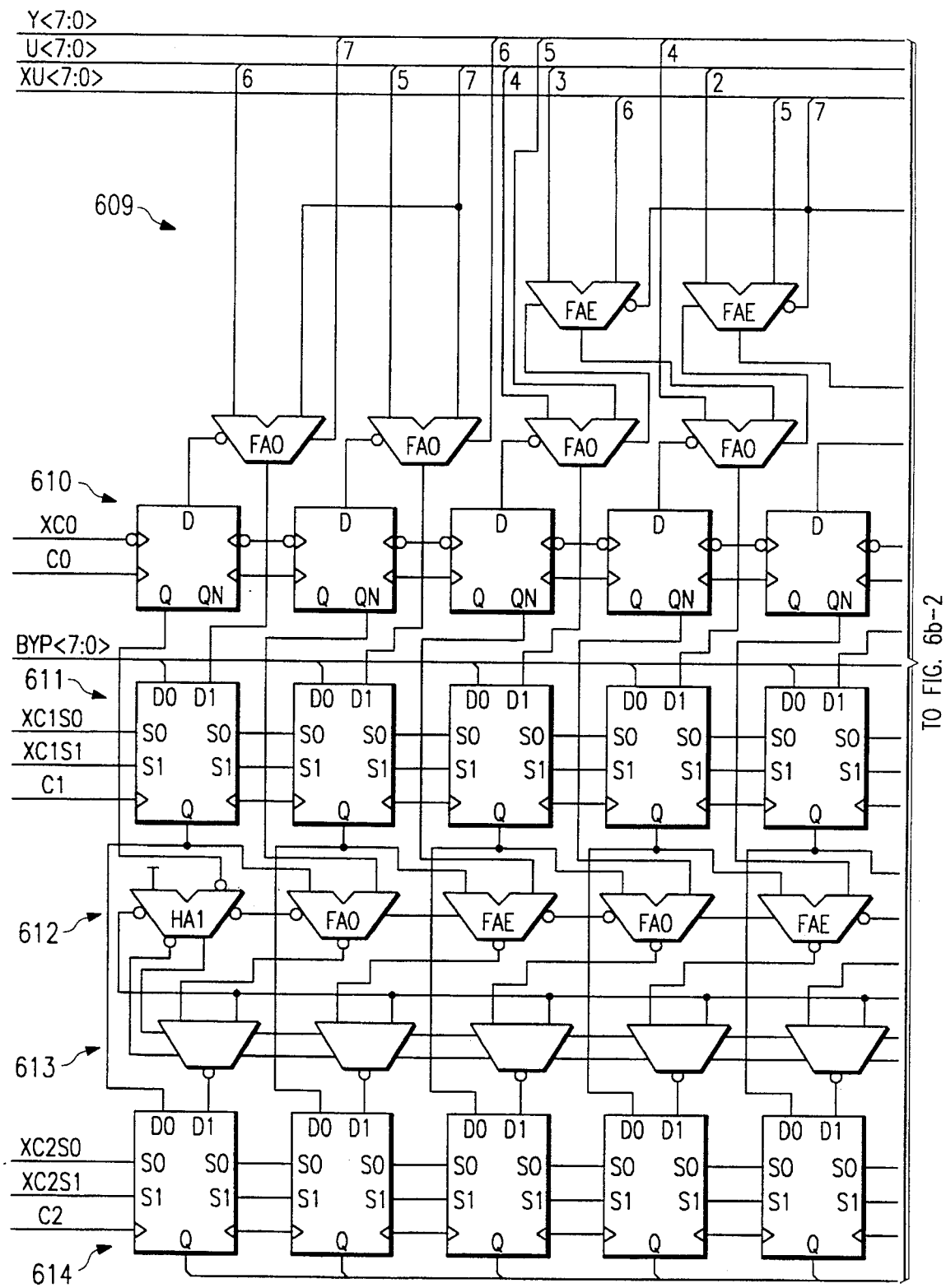
Figures 2, 6B:
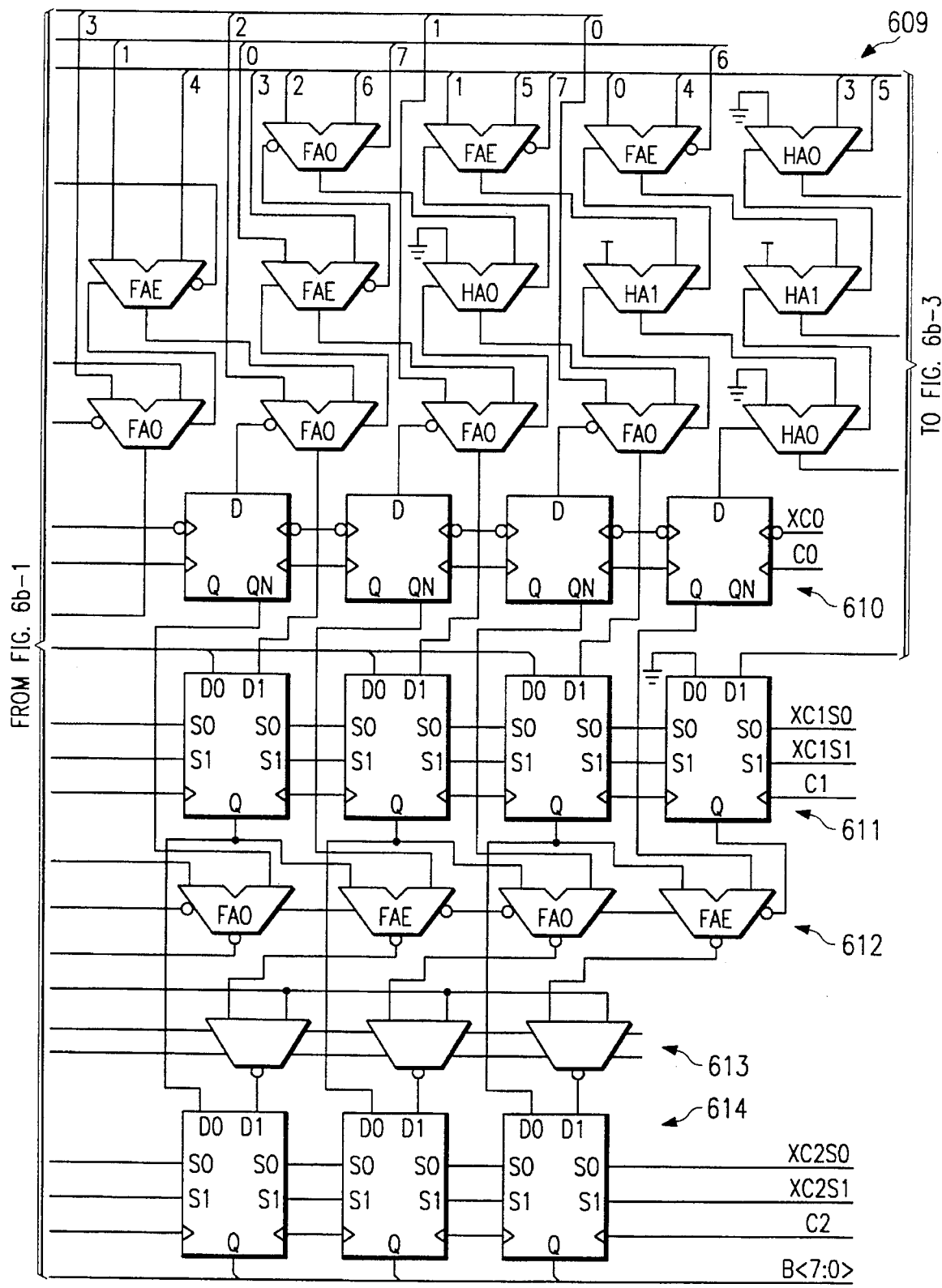
Figures 3, 6B:
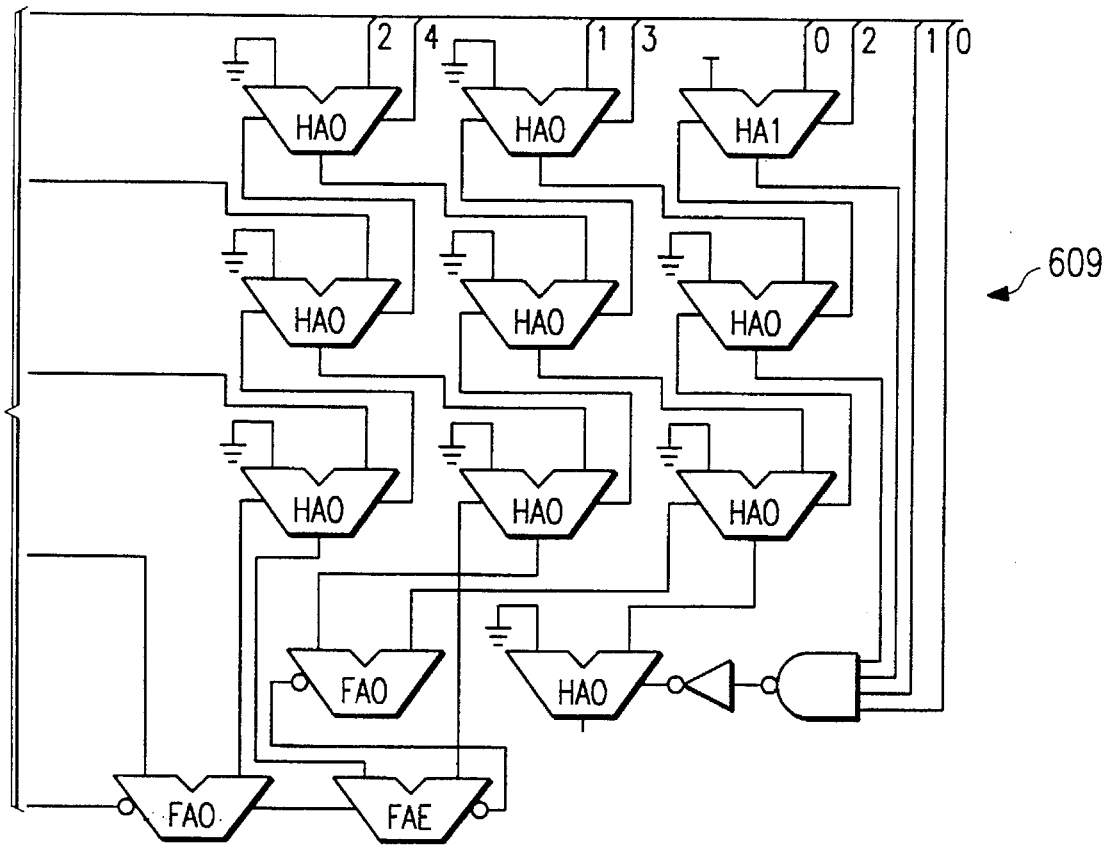

FIG. 6b is a more detailed electrical schematic of a selected one of the blue color converters 601 or 602. Blue color converters 601 and 602 generate blue color data from YUV data in accordance with the formula: B=Y+443÷256·(V−128). Blue color converters 601 and 602 each include an array of adders 609, a register 610 made up of a plurality of latches, an array 611 of flip flops, a second set of adders 612, an array of multiplexers 613 and a final set of flip flops 614. It should be noted that the subtraction of 128 from the U and V signals is due to the color difference signals being coded in excess 128 notation. The results are rounded to a bit with results less than zero set to zero and results greater than 255 set to 255.

Figures 1, 6C:
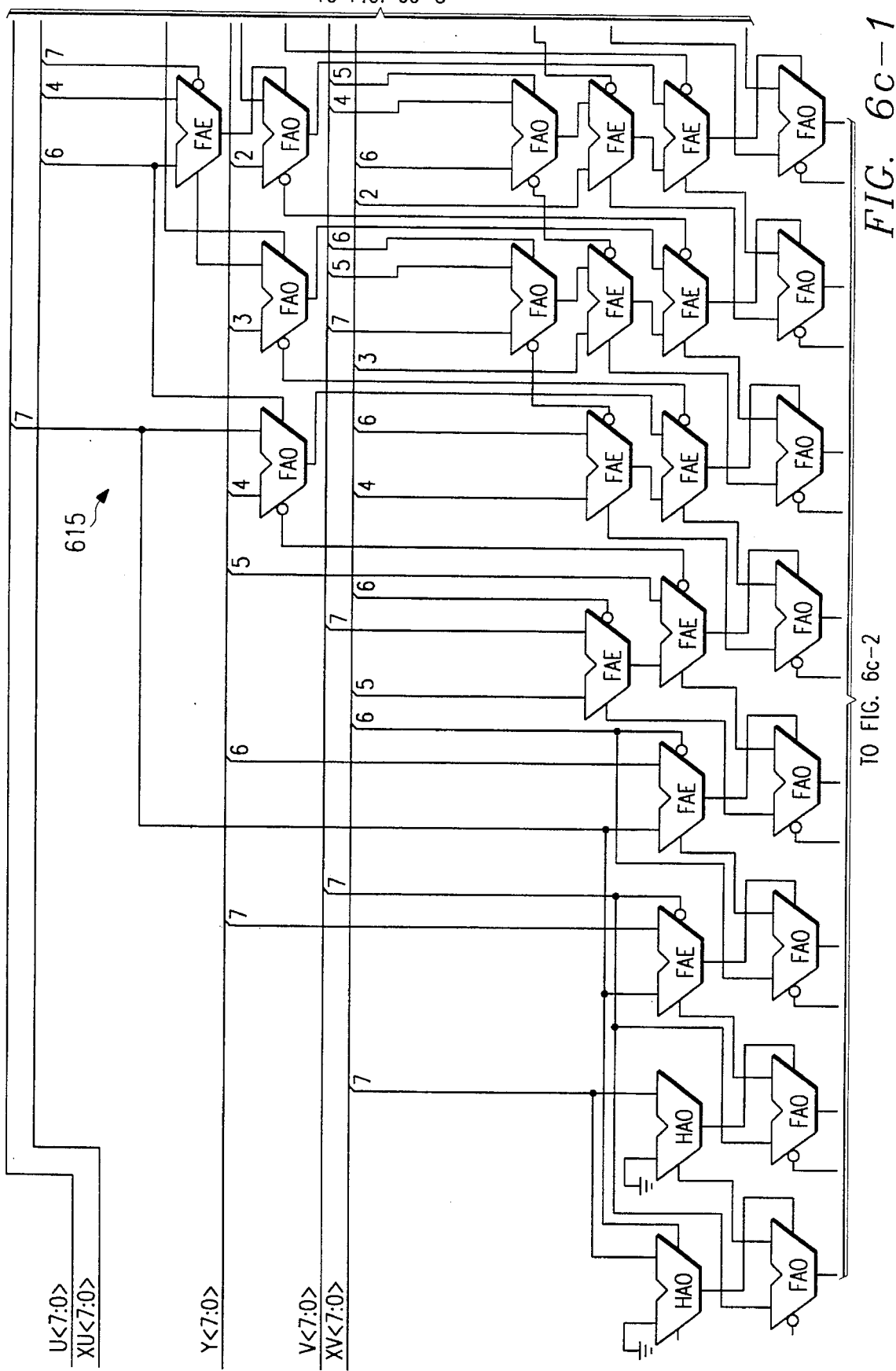
Figures 2, 6C:
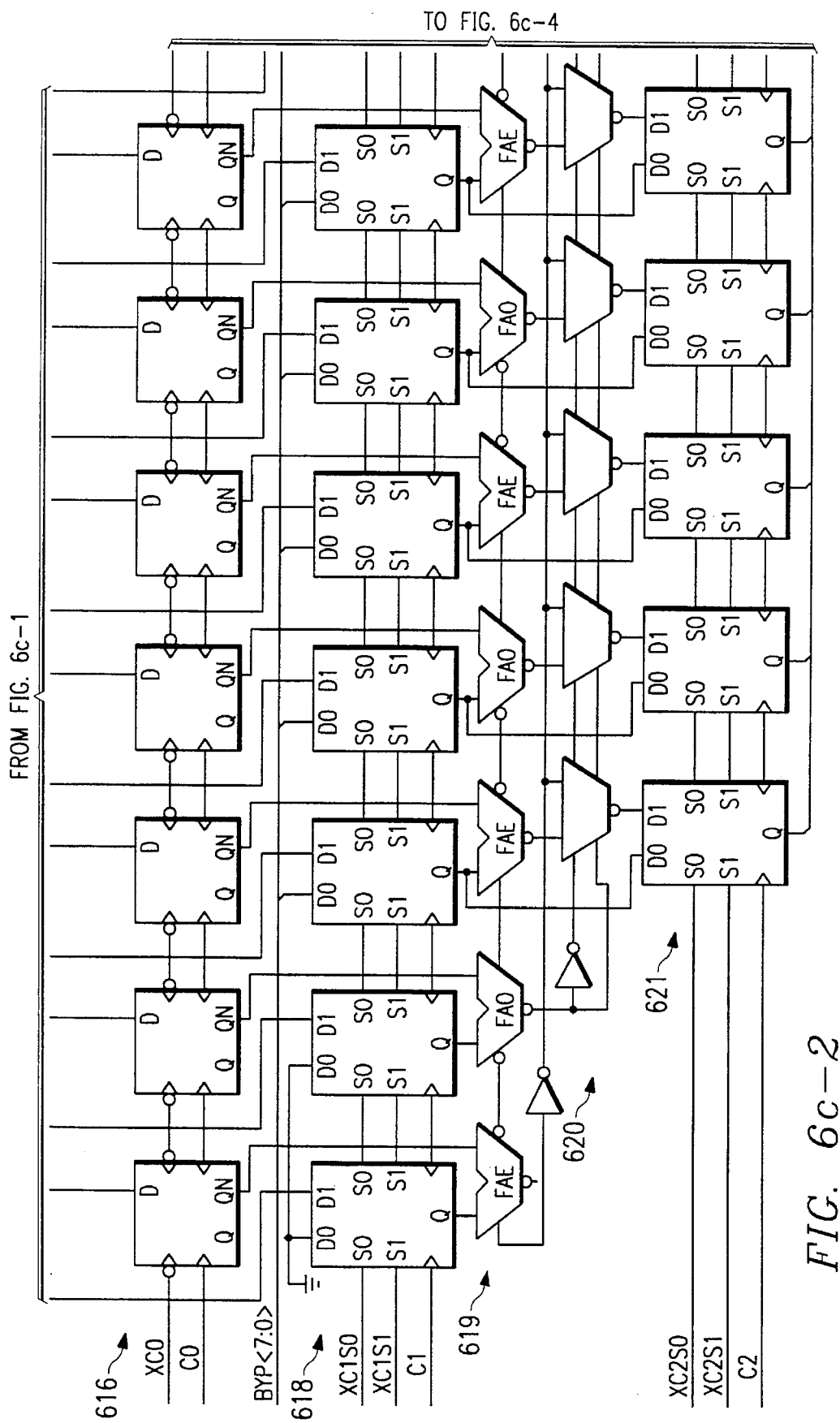
Figures 3, 6C:
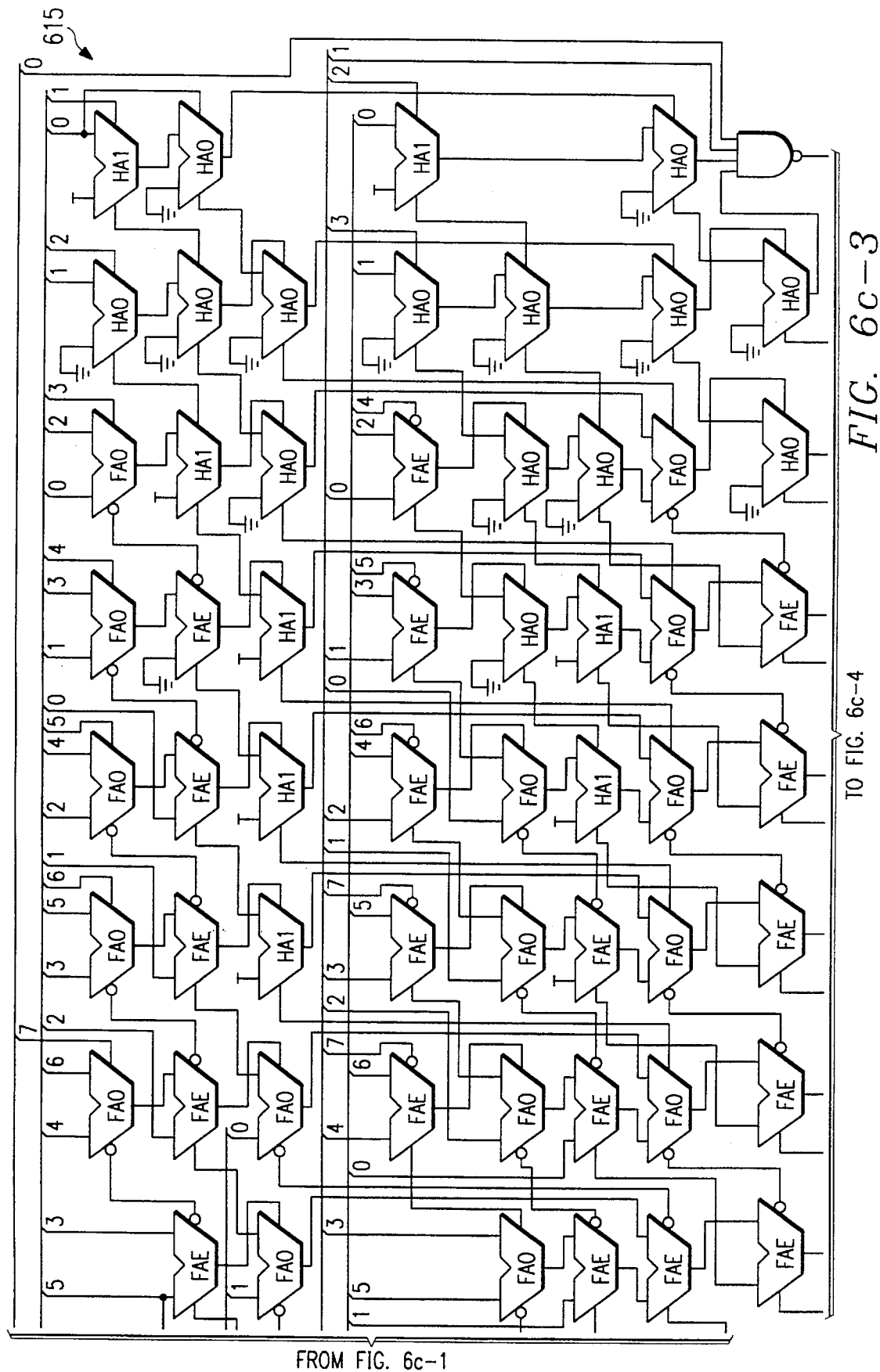
Figures 4, 6C:
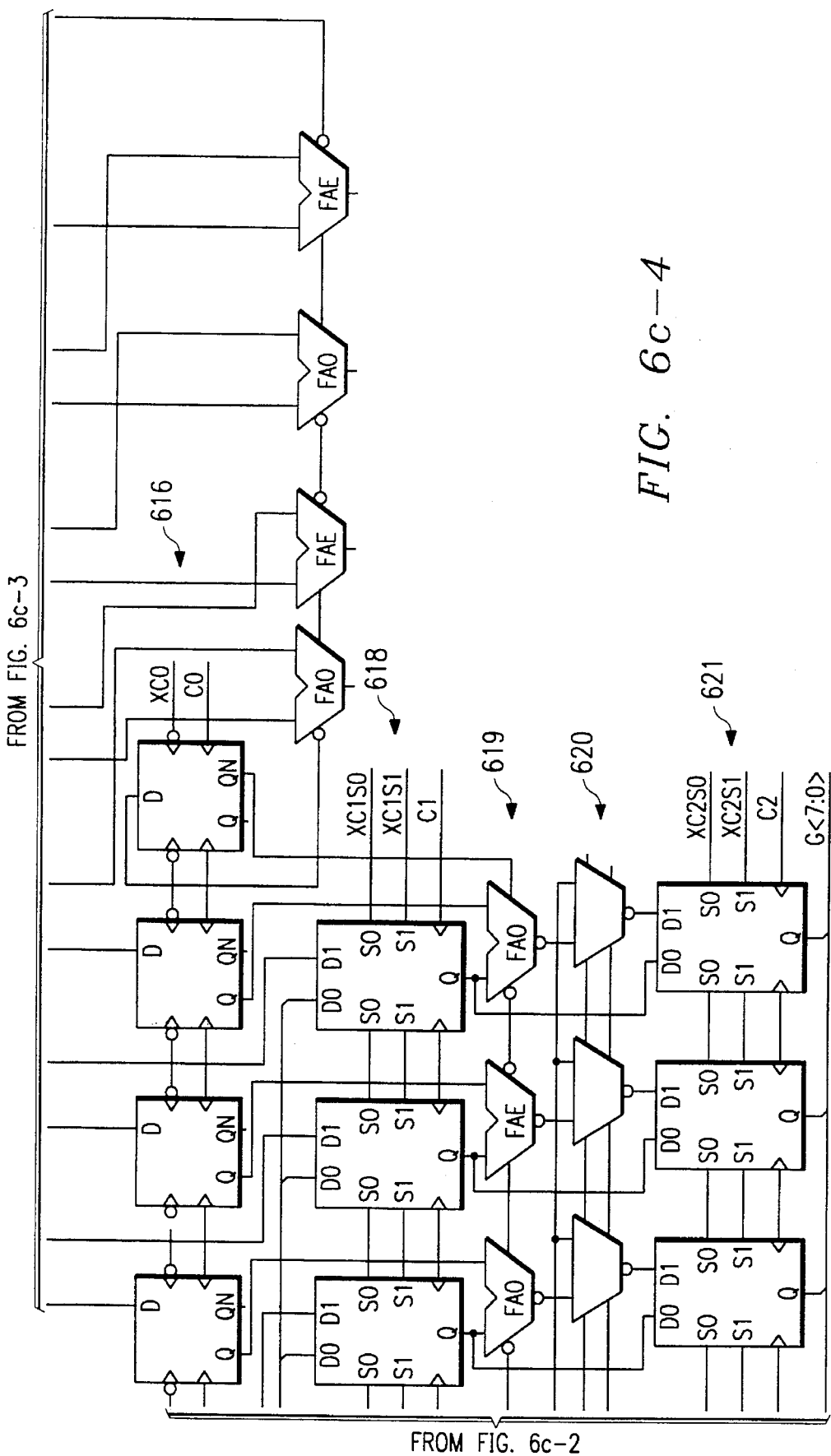

FIG. 6c is more detailed electrical schematic of a selected one of the green color conversion circuits 603 and 604. Green color conversion is accomplished according to the formula: G=Y−179÷256·(V−128)−86÷256·(U−128). Green color converters 603 and 604 each include an array of adders 615, a first array of flip flops 616, a second array of flip flops or latches 618, a second array of adders 619, a series of multiplexers 620 and a final array of flip flops or latches 621.

Figures 1, 6D:
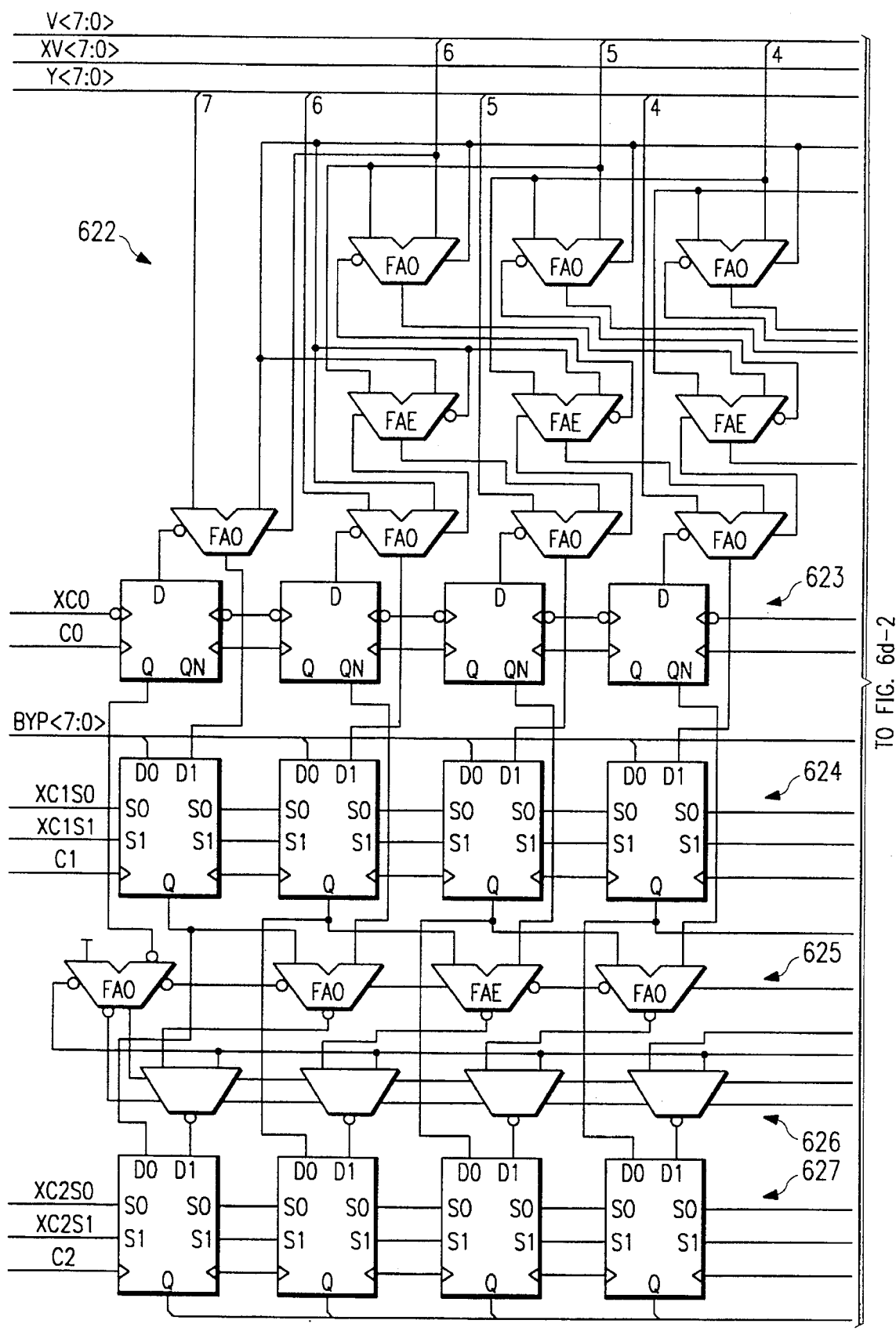
Figures 2, 6D:
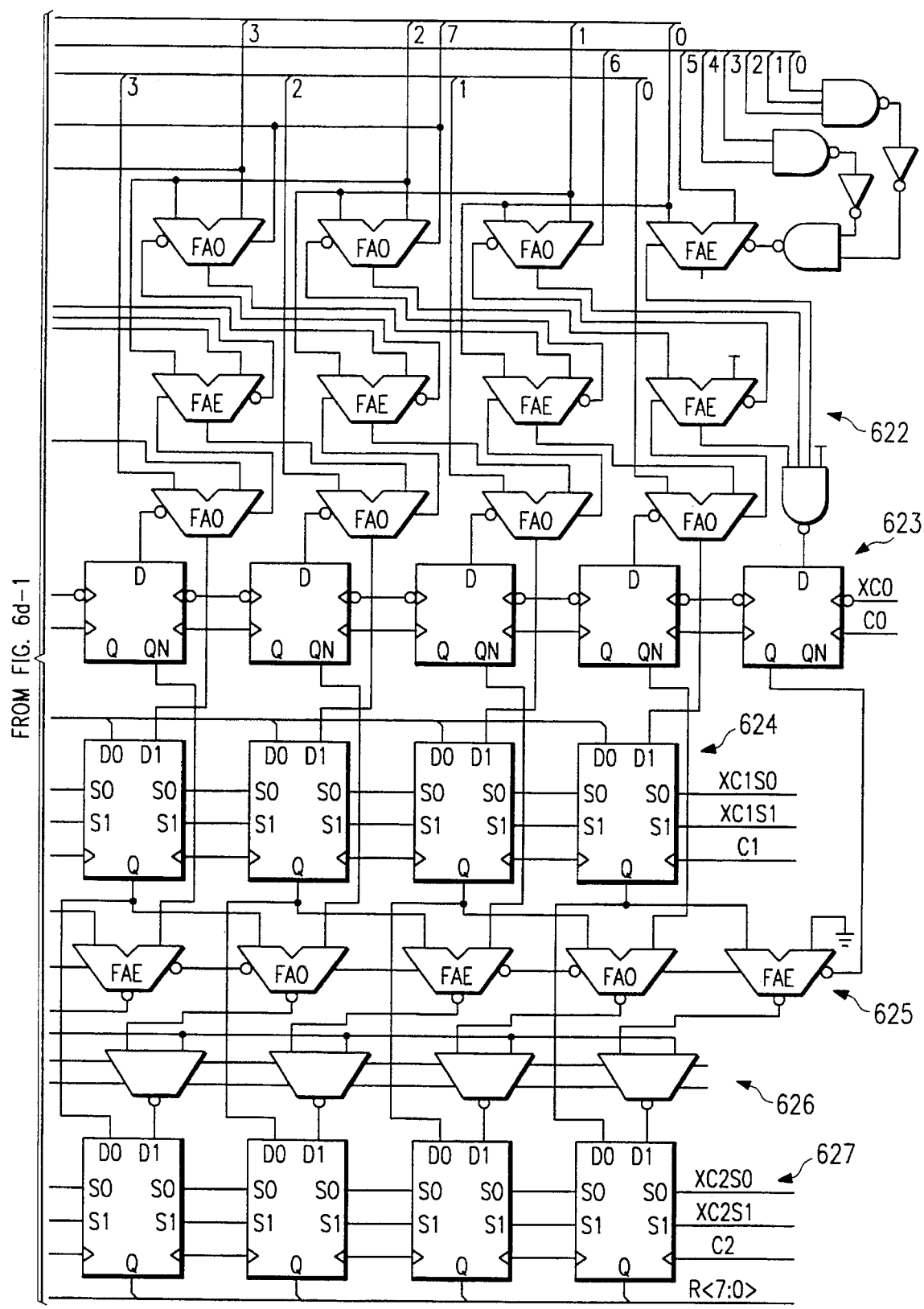

FIG. 6d is a more detailed schematic drawing of a selected one of the red color converters 605 and 606. Red color conversion is performed in accordance with the formula: R=Y+351÷256·(V−128). Each red color conversion circuits 605 and 606 include an array of adders 622, a first array of flip flops 623, second array of flip flops or latches 624, a second array of adders 625, an array of multiplexers 626 and a final set of latches 627.

Figure 7A:
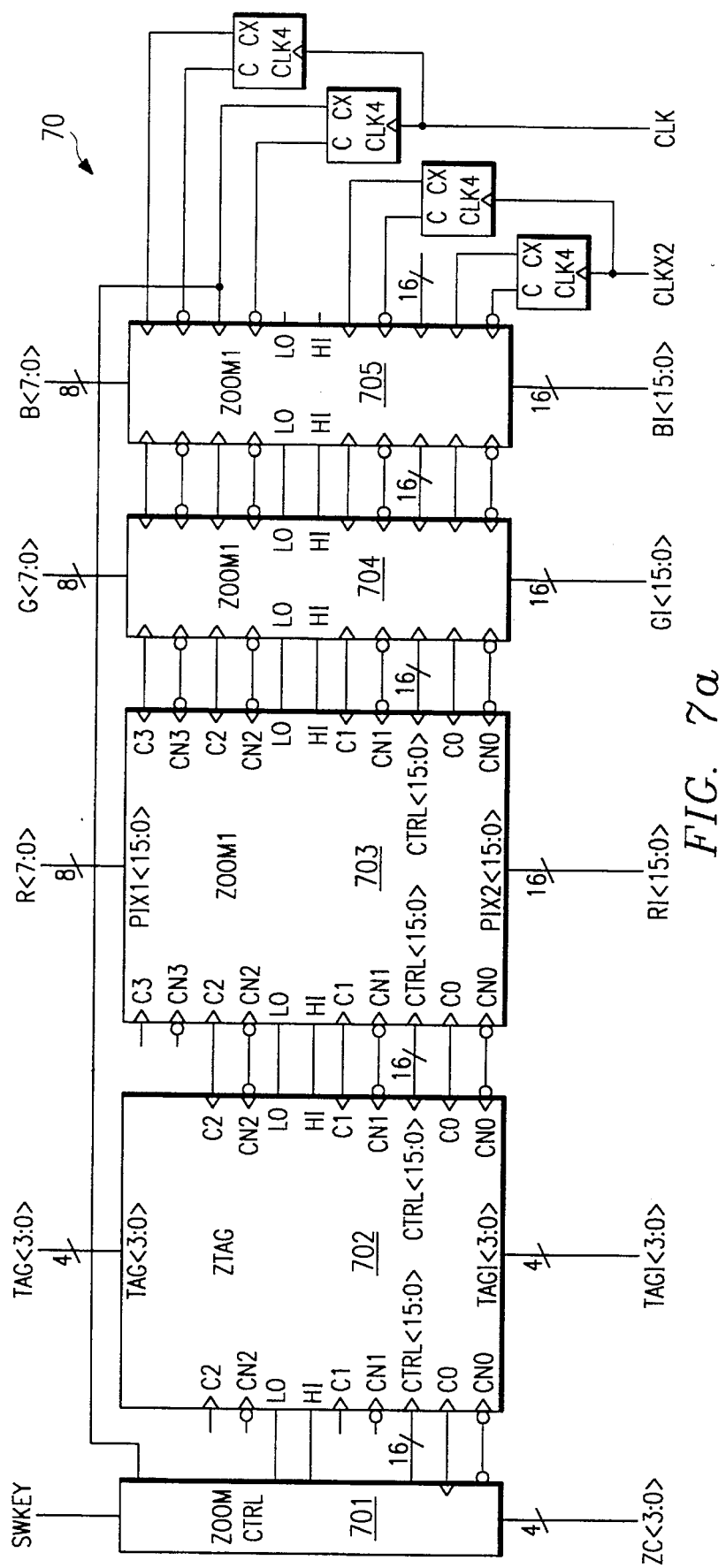
FIGS. 7a–7d are electrical schematic diagrams of the zoom control circuitry shown in FIG. 2.

FIG. 7a is a top level functional block diagram of zoom control circuit 70. Control circuitry 701 receives the 4-bits of zoom codes received with each pair of pixels and generates control signals therefrom for controlling the zooming function described further below. ZTAG circuitry 702 controls the zooming of the TAG information (TAG). This allows smooth tagging of non-rectangular video windows (the tags are not interpolated but are instead carried forward selectively from the previous pixel). Zoom circuits 703, 704 and 705 respectively perform zooming on the red, green, and blue pixel data (48-bits covering two 24-bit words of RGB data) respectively. A timing is maintained by clocks CLK and CLKX2 previously described above.

The zoom function allows for the pairs of pixel color data words output from color space matrix 60 to be used to display a larger number of pixels on the screen of display unit 107. In other words, data is generated for a selected number of pixels along a given line (X direction) of the screen of display unit 107, with the color data for a corresponding number of intervening pixels along the lines being filled in by the zoom function. According to the illustrated embodiment of the present invention, linear interpolation is used to generate the pixel data for the missing intervening pixels to be displayed using linear interpolation as controlled by the zoom codes ($Z_c$). Zoom code definition is provided in Table 2. $PIX_n$ and $PIX_{n+1}$ correspond to the first and second pixels (i.e., pixel 1 and pixel 2) of the current pair being received by zoom control circuitry 70 from color space matrix 60. Pixels $PIX_{n+2}$ and $PIX_{n+3}$ are the first and second pixels of the following pixel pair. The zoom code specified in Table II represents the zoom code attached (associated with) the current pixel pair.

In accordance with Table II, the zoom codes are decoded by control circuitry 701 and linear interpolation performed by zoom circuits 703, 704 and 705 for the received words of red, blue and green data, respectively. It should be noted that the zoom codes contain both interpolation data and timing data. Further, in the illustrated embodiment, the data received by DAC 20 may have been already "roughly zoomed" by simple doubling pixels (x-direction expansion) and doubling lines (y-direction expansion) by controlled output (clocking) from memory 107 by video processor 101. In this case, zoom control circuitry uses interpolation to provide a smoother zoom. For a further description of the "rough zooming" from the video frame buffer, reference is now made to copending and coassigned U.S. patent application Ser. No. 08/099,223, (Attorney Docket No. P3510-P10US) incorporated herein by reference. Zoom control circuitry 701 provides substantial advantages. By receiving zoom codes directly from processor 101 and data from memory 107 the bandwidth of frame buffer 107 is substantially reduced. Further, the results of the interpolation are provided at the output side of DAC 20.

Figures 1, 7B:
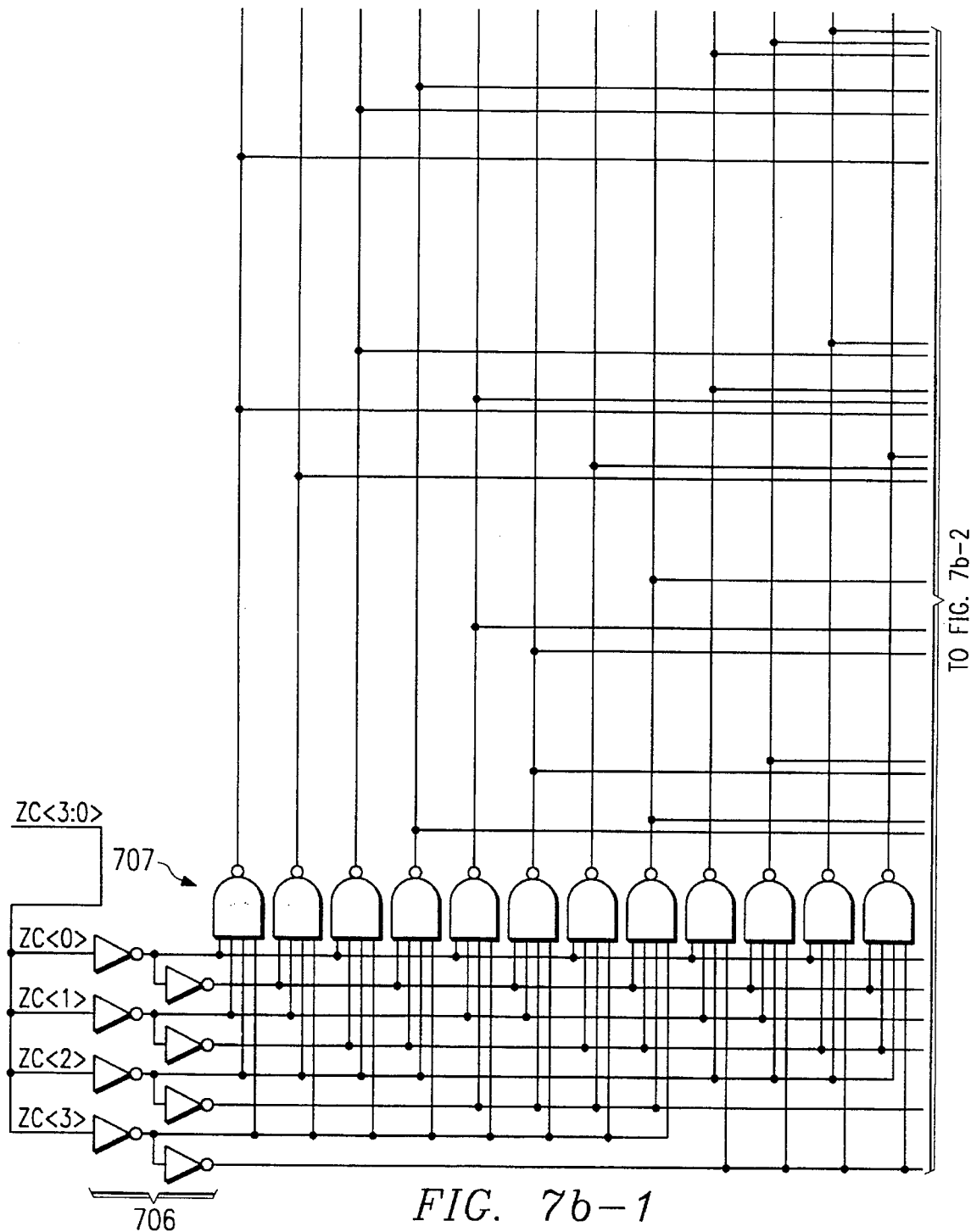
Figure 7B:
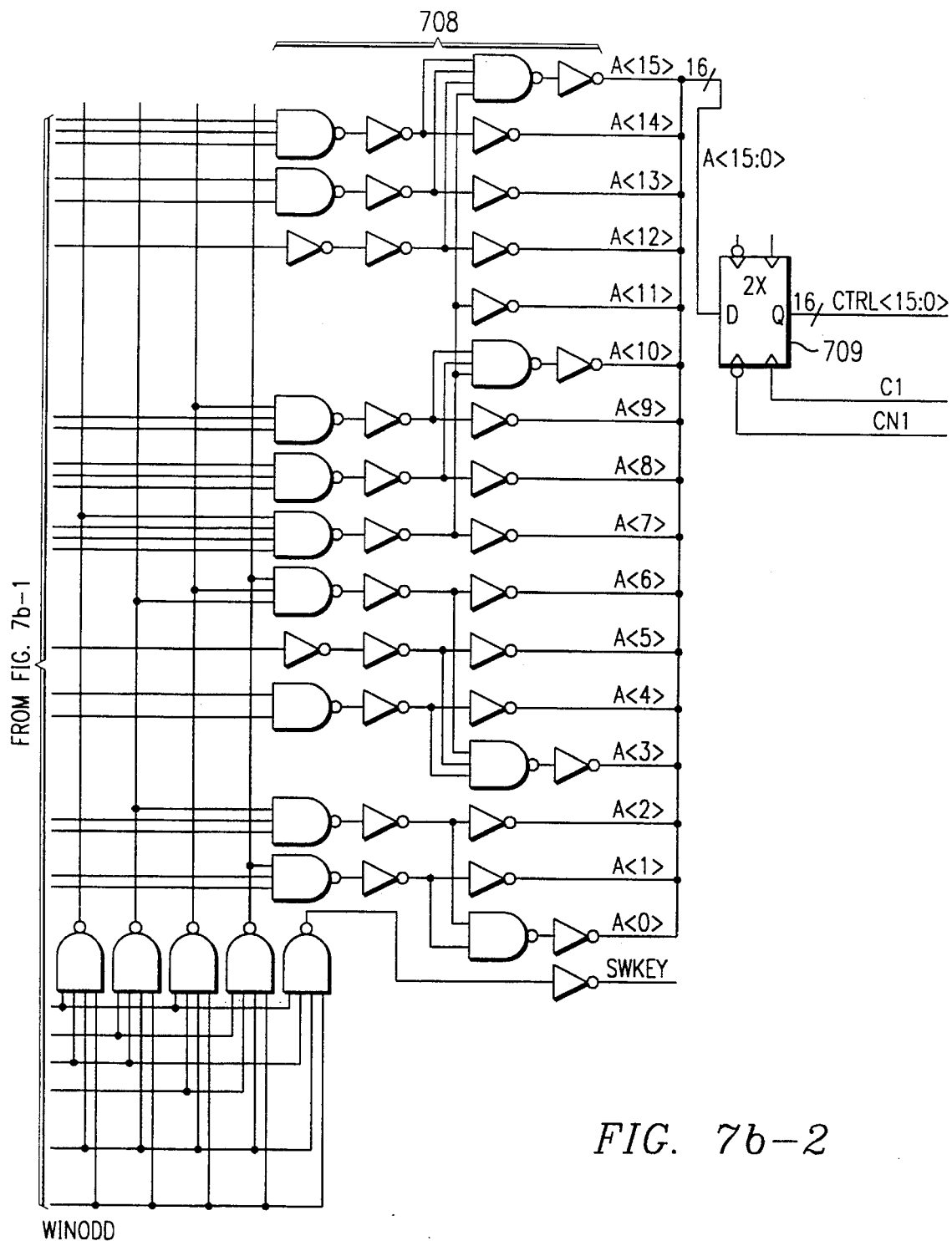
Figure 2:
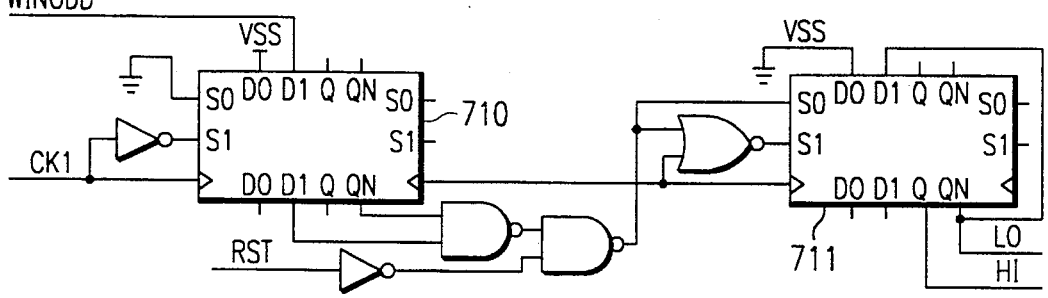

FIG. 7*b* is a detailed schematic diagram of control circuitry 701. Circuitry 701 receives 4-bits of zoom code at input ZC[3:0] and outputs sixteen control bits CTRL[15:0] in response. Control circuitry 701 includes an array of inverters 706, an array of NAND gates 707 and an array 708 of NAND gates and inverters. The 16-bits of control data are clocked out through flip flop 709. Flip flops 710 and 711 generate signals LO and HI from the clock (CLK) and control signals WINODD.

Control signal WINODD informs zoom control circuitry 701 of the location of the first pixel such that pixel timing is maintained for the LO/HI circuitry. The LO-HI control bits allow the output of the correct pixel in time. In other words, when LO is active, Pixel 0 (the first pixel) is output and when HI is active, the second pixel (Pixel 1) is output.

Figures 1, 7C:
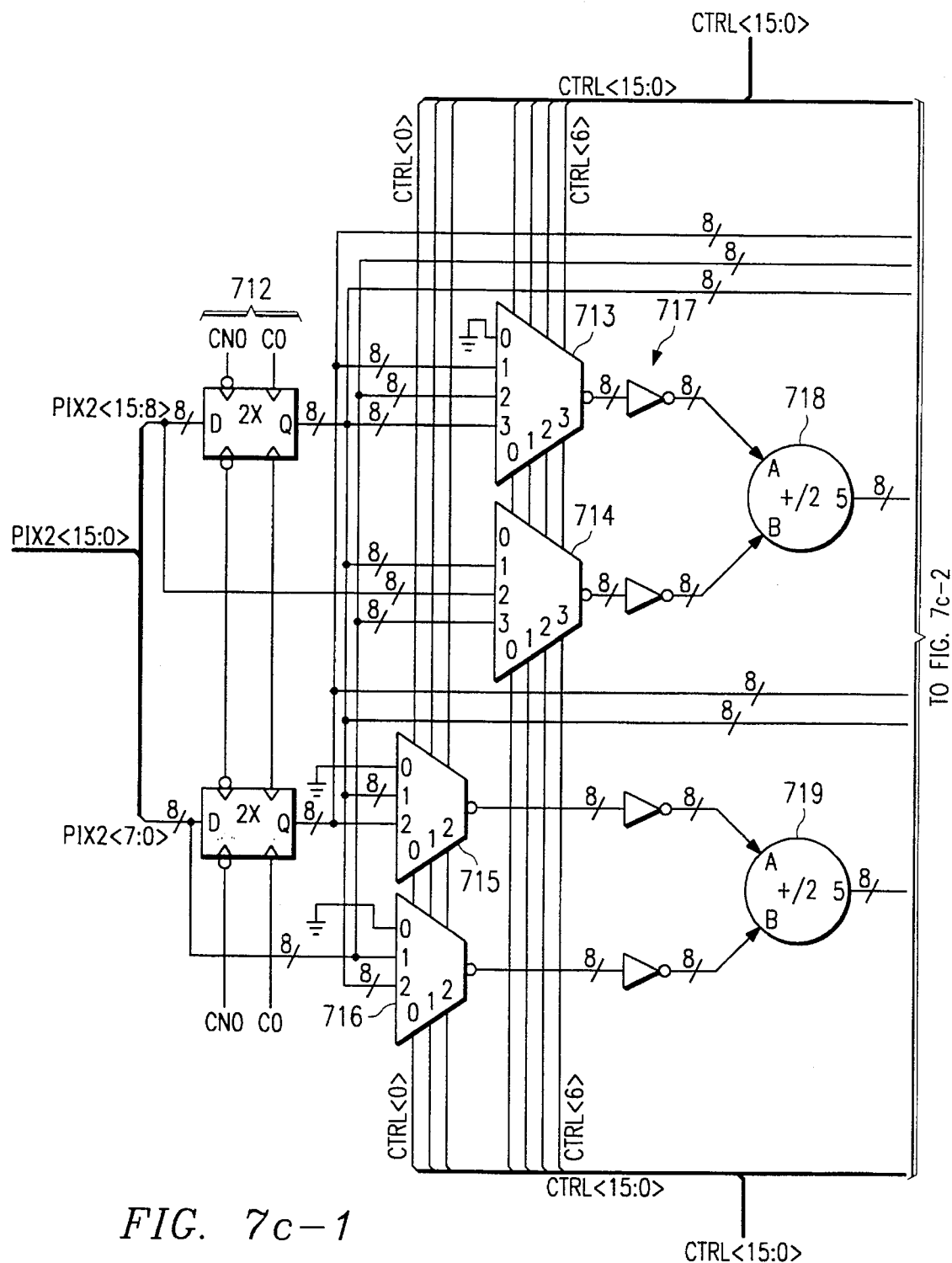
Figures 2, 7C:
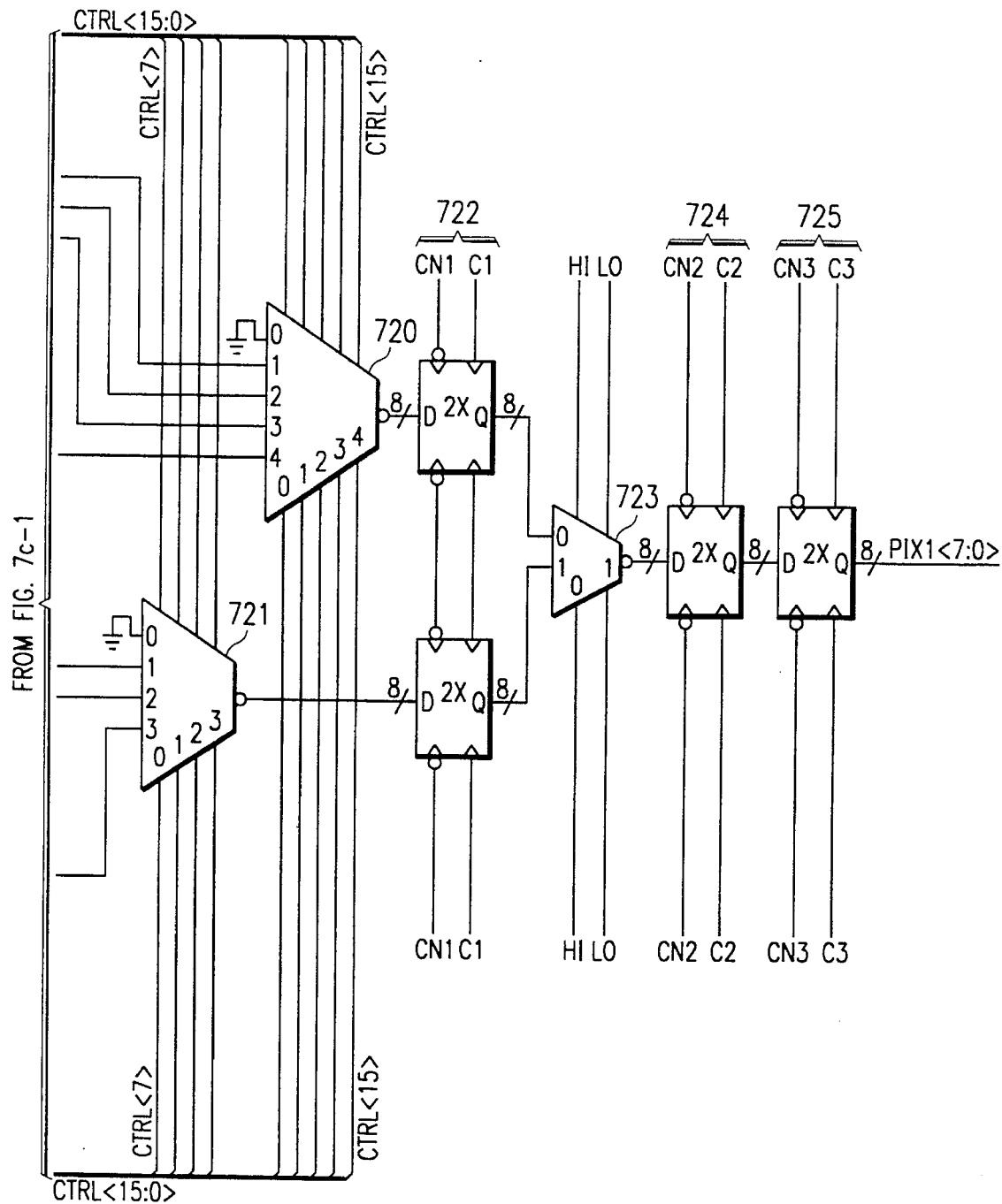

A detailed electrical schematic diagram of a selected one of the zoom circuits 703, 704 and 705 is shown in FIG. 7*c*. Each zoom circuit 703, 704 and 705 includes an input pipeline register 712, a first set of multiplexers 713, 714, 715 and 716, inverters 717, a pair of adder/divide by two circuits 718 and 719, a second pair of multiplexers 720 and 721, registers 722, an output multiplexer 723 and a pair of output pipeline registers 724 and 725. In accordance with the control signal CTRL[15:0] as decoded by control circuitry 701 from the zoom codes, each circuit 703–705 performs the corresponding operation in the righthand column of Table 2 for the corresponding red, blue or green data words.

Figure 7D:
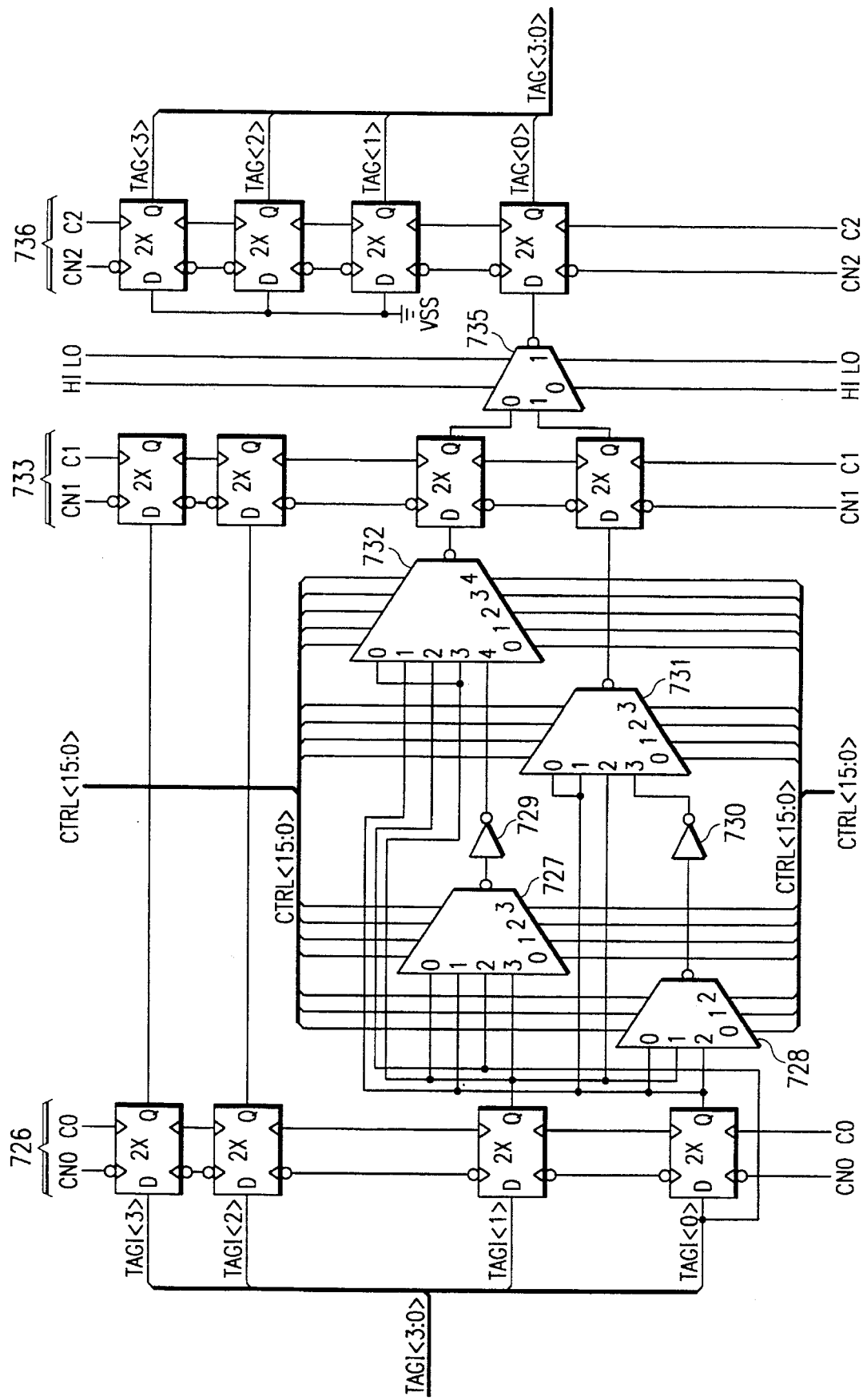

Also in accordance with the zoom codes listed in Table 2, as decoded into control signals CTRL by control circuitry 701, TAG zooming circuitry 702 ensures that the proper tags are attached (associated with) the newly generated pixel data. FIG. 7*d* is an electrical schematic diagram of TAG zoom circuitry 702. TAG zoom circuitry 702 includes an input register 726, input multiplexers 727 and 728, a pair of inverters 729 and 730, a second set of multiplexers 731 and 732, pipeline register 733, output multiplexer 735 and output register 736.

It should be noted that TAG is one method of determining whether graphics or video data is being displayed. The TAG bits are received by zoom control circuitry 701 on a pixel by pixel basis from the source image (memory 104). As discussed above, the TAGs in the illustrated embodiment are not interpolated but instead the adjacent pixel with the least significant index is replicated.

Gamma correction circuitry 80 accepts input data from zoom control circuitry 70 and outputs RGB formatted video data to mixing circuitry 205 (FIGS. 1 and 2). The gamma corrector circuitry utilizes three 256×8 memories, one for each color channel. In a preferred embodiment, the three 256×8 memories are incorporated along with the color look-up table memory 213. The gamma corrector memory can be programmed with either a custom correction table or simply for removing the gamma coating that is normally present in UYV video signals.

FIG. 8 is a functional block diagram depicting the look of table/gamma correction memory 213 and associated addressing circuitry. In normal operation, and when video data is being sent for display on display unit 107, a selector 801 passes the video data to memory 213 and the gamma correction table is accessed. The gamma corrected video data is then output through register 802. The preferred embodiment of gamma corrector 80 however also includes an optional feature in which the user can bypass the gamma correction table and fee data directly to video display 107 without gamma correction. In this case, a bit (bit 4) in the video setup register of control registers 218 is set and a signal A-8 provided to multiplexers 803 and 804. The 24-bits of video RGB data (VRGB) is then passed by multiplexer 804 through register 805 directly to video display 107.

Although the present invention and its advantages have been described in detail, it should be understood that various changes, substitutions and alterations can be made herein without departing from the spirit and scope of the invention as defined by the appended claims.

TABLE I

Input Data Formats To Format Aligner

| Pixel Word VSD[31:0] | YUV 16-bit Non-Tagged | YUV 16-bit Tagged | RGB 16-bit Non-Tagged | RGB 16-bit Tagged | RGB 24-bit Non-Tagged | RGB 24-bit Tagged |
|---|---|---|---|---|---|---|
| VSD[31] | Y1-7 | Y1-7 | R1-7 | TAG 1 | X | TAG 0 |
| VSD[30] | Y1-6 | Y1-6 | R1-6 | R1-7 | X | X |
| VSD[29] | Y1-5 | Y1-5 | R1-5 | R1-6 | X | X |
| VSD[28] | Y1-4 | Y1-4 | R1-4 | R1-5 | X | X |
| VSD[27] | Y1-3 | Y1-3 | R1-3 | R1-4 | X | X |
| VSD[26] | Y1-2 | Y1-2 | G1-7 | R1-3 | X | X |
| VSD[25] | Y1-1 | Y1-1 | G1-6 | G1-7 | X | X |
| VSD[24] | Y1-0 | Y1-0 | G1-5 | G1-6 | X | X |
| VSD[23] | V0-7 | V0-7 | G1-4 | G1-5 | R0-7 | R0-7 |
| VSD[22] | V0-6 | V0-6 | G1-3 | G1-4 | R0-6 | R0-6 |
| VSD[21] | V0-5 | V0-5 | G1-2 | G1-3 | R0-5 | R0-5 |
| VSD[20] | V0-4 | V0-4 | B1-7 | B1-7 | R0-4 | R0-4 |
| VSD[19] | V0-3 | V0-3 | B1-6 | B1-6 | R0-3 | R0-3 |
| VSD[18] | V0-2 | V0-2 | B1-5 | B1-5 | R0-2 | R0-2 |
| VSD[17] | V0-1 | V0-1 | B1-4 | B1-4 | R0-1 | R0-1 |
| VSD[16] | V0-0 | TAG 1 | B1-3 | B1-3 | R0-0 | R0-0 |
| VSD[15] | Y0-7 | Y0-7 | R0-7 | TAG 0 | G0-7 | G0-7 |
| VSD[14] | Y0-6 | Y0-6 | R0-6 | R0-7 | G0-6 | G0-6 |
| VSD[13] | Y0-5 | Y0-5 | R0-5 | R0-6 | G0-5 | G0-5 |
| VSD[12] | Y0-4 | Y0-4 | R0-4 | R0-5 | G0-4 | G0-4 |
| VSD[11] | Y0-3 | Y0-3 | R0-3 | R0-4 | G0-3 | G0-3 |
| VSD[10] | Y0-2 | Y0-2 | G0-7 | R0-3 | G0-2 | G0-2 |
| VSD[9] | Y0-1 | Y0-1 | G0-6 | G0-7 | G0-1 | G0-1 |
| VSD[8] | Y0-0 | Y0-0 | G0-5 | G0-6 | G0-0 | G0-0 |
| VSD[7] | U0-7 | U0-7 | G0-4 | G0-5 | B0-7 | B0-7 |
| VSD[6] | U0-6 | U0-6 | G0-3 | G0-4 | B0-6 | B0-6 |
| VSD[5] | U0-5 | U0-5 | G1-2 | G0-3 | B0-5 | B0-5 |
| VSD[4] | U0-4 | U0-4 | B1-7 | B0-7 | B0-4 | B0-4 |
| VSD[3] | U0-3 | UD-3 | B1-6 | B0-6 | B0-3 | B0-3 |
| VSD[2] | U0-2 | U0-2 | B1-5 | B0-5 | B0-2 | B0-2 |
| VSD[1] | U0-1 | U0-1 | B1-4 | B0-4 | B0-1 | B0-1 |
| VSD[0] | U0-0 | TAG 0 | B1-3 | B0-3 | B0-0 | B0-0 |

TABLE II

ZOOM CODE DEFINITION

| ZOOM CODE | | LINEAR INTERPOLATION CASE | |
|---|---|---|---|
| ZC <3:2> | ZC<1:0> | Display Pixel 1 (P1) | Display Pixel 0 (P0) |
| 00 | 00 | $Pix_n$ | $Pix_n$ |
| 00 | 01 | Not Used | Not Used |
| 00 | 10 | $Pix_{n+2}$ | $Pix_{n+1}$ |
| 00 | 11 | $Pix_{n+2}$ | $(Pix_{n+1} + Pix_{n+2})/2$ |
| 01 | 00 | $(Pix_n + Pix_{n+1})/2$ | $Pix_n$ |
| 01 | 01 | $(Pix_n + Pix_{n+1})/2$ | $(Pix_n + Pix_{n+1})/2$ |
| 01 | 10 | Not Used | Not Used |
| 01 | 11 | $(Pix_{n+2} + Pix_{n+3})/2$ | $(Pix_{n+1} + Pix_{n+2})/2$ |
| 10 | 00 | $Pix_{n+1}$ | $Pix_n$ |
| 10 | 01 | $Pix_{n+1}$ | $(Pix_n + Pix_{n+1})/2$ |
| 10 | 10 | $Pix_{n+1}$ | $Pix_{n+1}$ |
| 10 | 11 | Not Used | Not Used |
| 11 | 00 | Blank | Blank |
| 11 | 01 | $(Pix_{n+1} + Pix_{n+2})/2$ | $(Pix_n + Pix_{n+2})/2$ |
| 11 | 10 | $(Pix_{n+1} + Pix_{n+2})/2$ | $Pix_{n+1}$ |
| 11 | 11 | $(Pix_{n+1} + Pix_{n+2})/2$ | $(Pix_{n+1} + Pix_{n+2})/2$ |

What is claimed is:

1. A method for transferring a stream of video data from a video data source including a video processor and a video frame buffer to a display interface unit, comprising the steps of:

writing each video data word of the stream of video data from the video frame buffer to an input of a first-in-first-out memory with a first clock signal received from the video processor;

adding an address used for writing the video data into the first-in-first-out memory with the inverse of an address used for reading the video data out of memory;

decoding a sum produced during said step of adding and in response transmitting a signal signaling that the first-in-first-out memory is becoming full when the sum exceeds a preselected value; and reading each video data word of the stream of video data from an output of the first-in-first-out memory with a second clock signal derived from a clock signal received from an associated graphic controller, the first and second clock signals maintaining the stream of video data at the output of the first-in-first, out memory without interruption independent of interruptions in the video data stream occurring at the input of the first-in-first-out memory.

2. The method of claim 1 wherein the first clock comprises a video clock.

3. The method of claim 1 wherein the second clock comprises a pixel clock.

* * * * *